(12) United States Patent
Hama et al.

(10) Patent No.: US 10,460,093 B2
(45) Date of Patent: Oct. 29, 2019

(54) TERMINAL DEVICE, METHOD, AND PROGRAM

(71) Applicant: SONY MOBILE COMMUNICATIONS INC., Tokyo (JP)

(72) Inventors: Tatsuya Hama, Tokyo (JP); Alvaro Arregui Falcon, London (GB)

(73) Assignee: SONY CORPORATION, Tokyo (JP)

( * ) Notice: Subject to any disclaimer, the term of this patent is extended or adjusted under 35 U.S.C. 154(b) by 215 days.

(21) Appl. No.: 15/430,710

(22) Filed: Feb. 13, 2017

(65) Prior Publication Data

US 2017/0242993 A1 Aug. 24, 2017

Related U.S. Application Data

(60) Provisional application No. 62/297,558, filed on Feb. 19, 2016.

(51) Int. Cl.
*G06F 21/32* (2013.01)
*G06F 21/44* (2013.01)
*H04W 12/06* (2009.01)
*G06F 3/0484* (2013.01)
*G06F 3/0488* (2013.01)
*G06K 9/00* (2006.01)

(52) U.S. Cl.
CPC ............. *G06F 21/32* (2013.01); *G06F 21/44* (2013.01); *G06F 3/0484* (2013.01); *G06F 3/0488* (2013.01); *G06K 9/00087* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2010/0257490 A1 | 10/2010 | Lyon et al. | |
| 2012/0009896 A1* | 1/2012 | Bandyopadhyay | ... G06F 1/1643 455/411 |
| 2013/0093707 A1* | 4/2013 | Park | ...................... G06F 21/31 345/173 |
| 2014/0137049 A1* | 5/2014 | Jung | .................... H04W 12/06 715/847 |
| 2014/0162605 A1 | 6/2014 | Dwarkaprasad et al. | |
| 2014/0283142 A1* | 9/2014 | Shepherd | ............. G06F 3/0482 726/30 |
| 2014/0295795 A1 | 10/2014 | Miyazaki et al. | |
| 2014/0359757 A1* | 12/2014 | Sezan | ..................... G06F 21/32 726/19 |

(Continued)

FOREIGN PATENT DOCUMENTS

JP 2008-287702 11/2008

OTHER PUBLICATIONS

Extended European Search Report dated Jun. 14, 2017 in Patent Application No. 17155729.1.

*Primary Examiner* — Benjamin E Lanier
(74) *Attorney, Agent, or Firm* — Xsensus LLP

(57) ABSTRACT

There is provided a terminal device including: a detector configured to detect start of an authentication process for authenticating a user; and a display controller configured to display, during the authentication process, an authentication process screen by using a first image included in a first display screen that is displayed after the authentication process succeeds.

13 Claims, 24 Drawing Sheets

(56) References Cited

U.S. PATENT DOCUMENTS

| | | | |
|---|---|---|---|
| 2015/0074615 A1* | 3/2015 | Han | G06K 9/00033 |
| | | | 715/863 |
| 2015/0126246 A1* | 5/2015 | Lombardi | G06F 3/041 |
| | | | 455/556.1 |
| 2015/0146945 A1 | 5/2015 | Han et al. | |
| 2015/0212640 A1* | 7/2015 | Fang | G06F 3/0488 |
| | | | 345/173 |
| 2015/0215444 A1* | 7/2015 | Tang | G06F 3/04883 |
| | | | 455/411 |
| 2015/0324569 A1* | 11/2015 | Hong | G06F 21/32 |
| | | | 345/174 |
| 2015/0334570 A1 | 11/2015 | Nade | |
| 2015/0347811 A1 | 12/2015 | Kim | |
| 2016/0042166 A1* | 2/2016 | Kang | G06F 21/32 |
| | | | 726/7 |
| 2016/0252969 A1* | 9/2016 | Lee | G06F 3/017 |
| | | | 345/156 |
| 2017/0230358 A1* | 8/2017 | Hamasaki | G06F 21/31 |

\* cited by examiner

TERMINAL DEVICE, METHOD, AND PROGRAM

CROSS REFERENCE TO RELATED APPLICATIONS

This application claims the benefit of U.S. Provisional Application 62/297,558 filed Feb. 19, 2016, the entire contents of which are incorporated herein by reference.

BACKGROUND

The present disclosure relates to terminal devices, methods, and programs.

In recent years, terminal devices configured to perform an authentication process of a user have been developed to protect information. An operation of the terminal device configured to perform the authentication process is possible after the user is authenticated.

JP 2008-287702A discloses the terminal device configured to perform user authentication. Operation control of the terminal device according to JP 2008-287702A is performed by carrying out fingerprint authentication using a liquid crystal panel.

SUMMARY

However, in the terminal device according to 2008-287702A, a displayed screen does not change during the user authentication process. Therefore, it is difficult for a user to recognize whether or not the authentication process is going on. Accordingly, the present disclosure proposes a terminal device, method, and program by which a user can recognize that an authentication process is going on from content of a display screen.

According to an embodiment of the present disclosure, there is provided a terminal device including: a detector configured to detect start of an authentication process for authenticating a user; and a display controller configured to display, during the authentication process, an authentication process screen by using a first image included in a first display screen that is displayed after the authentication process succeeds.

In addition, according to an embodiment of the present disclosure, there is provided a method including: detecting start of an authentication process for authenticating a user; and causing a processor to display, during the authentication process, an authentication process screen by using a first image included in a first display screen that is displayed after the authentication process succeeds.

In addition, according to an embodiment of the present disclosure, there is provided a program causing a processor to: detect start of an authentication process for authenticating a user; and displaying, during the authentication process, an authentication process screen by using a first image included in a first display screen that is displayed after the authentication process succeeds.

As described above, according to the embodiments of the present disclosure, a user can recognize that an authentication process is going on from content of a display screen.

Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Figure 1:
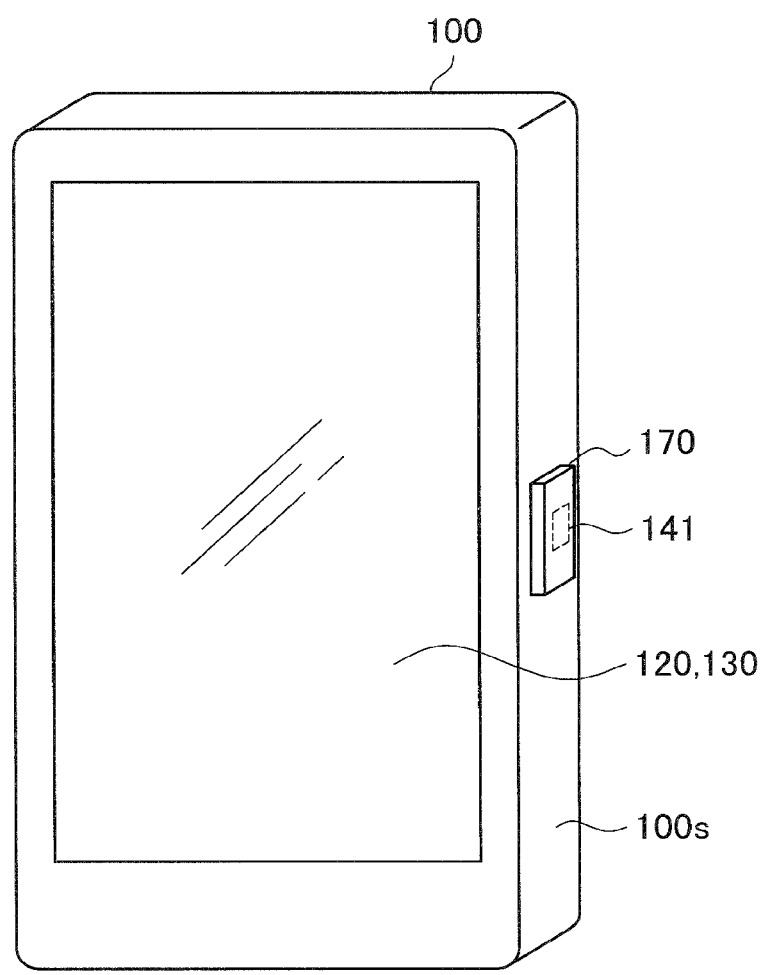
FIG. 1 is a diagram illustrating an example of a terminal device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that the description is given in the following order.
1. Configuration of terminal device
2. Method for displaying authentication process screen
3. First modified embodiment
4. Second modified embodiment
5. Third modified embodiment
6. Fourth modified embodiment
7. Fifth modified embodiment
8. Supplement
9. Conclusion

1. Configuration of Terminal Device

<1-1. Summary of Terminal Device>

FIG. 1 is a diagram illustrating external appearance of a terminal device 100 according to an embodiment of the present disclosure. As illustrated in FIG. 1, the terminal device 100 may be a smartphone, for example. A display 120 and a touch panel 130 are disposed on a front side of a housing of the terminal device 100. In addition, a fingerprint reader 170 and a power button 141 are disposed on a side surface 100s of the housing of the terminal device 100. The power button 141 is buried under the fingerprint reader 170. In the terminal device 100 according to the embodiment, fingerprint authentication is performed to authenticate a user. Hereinafter, an example in which the fingerprint authentication is performed to authenticate a user will be described. However, an authentication method used for authenticating a user is not limited to the fingerprint authentication.

Figure 2:
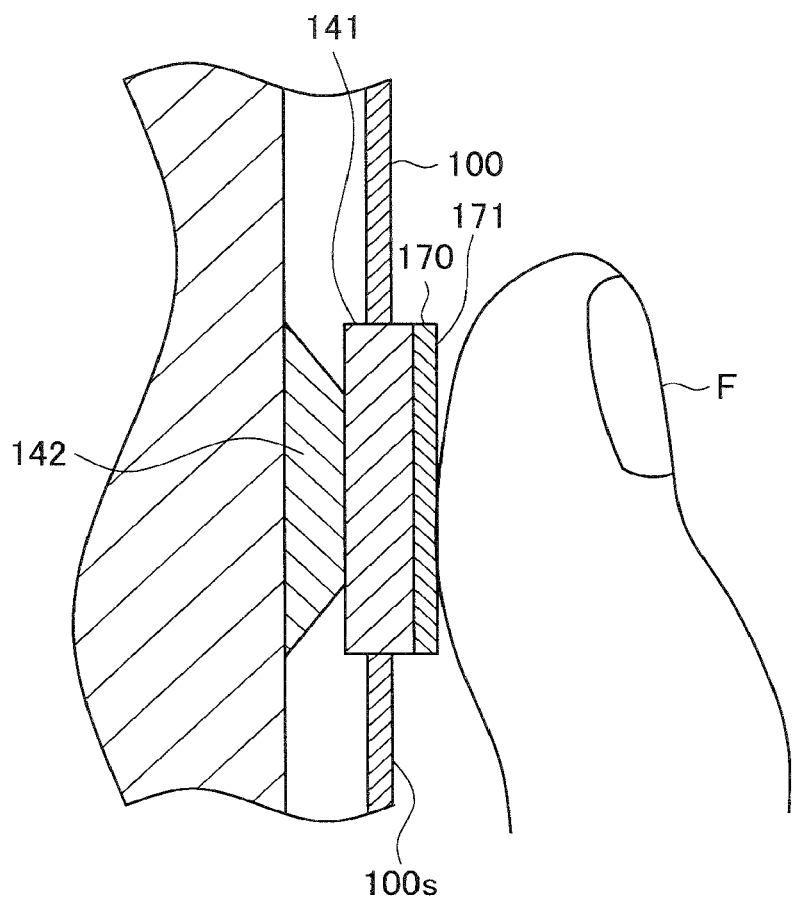
FIG. 2 is a diagram illustrating an example of a configuration of a fingerprint reader of a terminal device according to an embodiment of the present disclosure.
Figure 3:
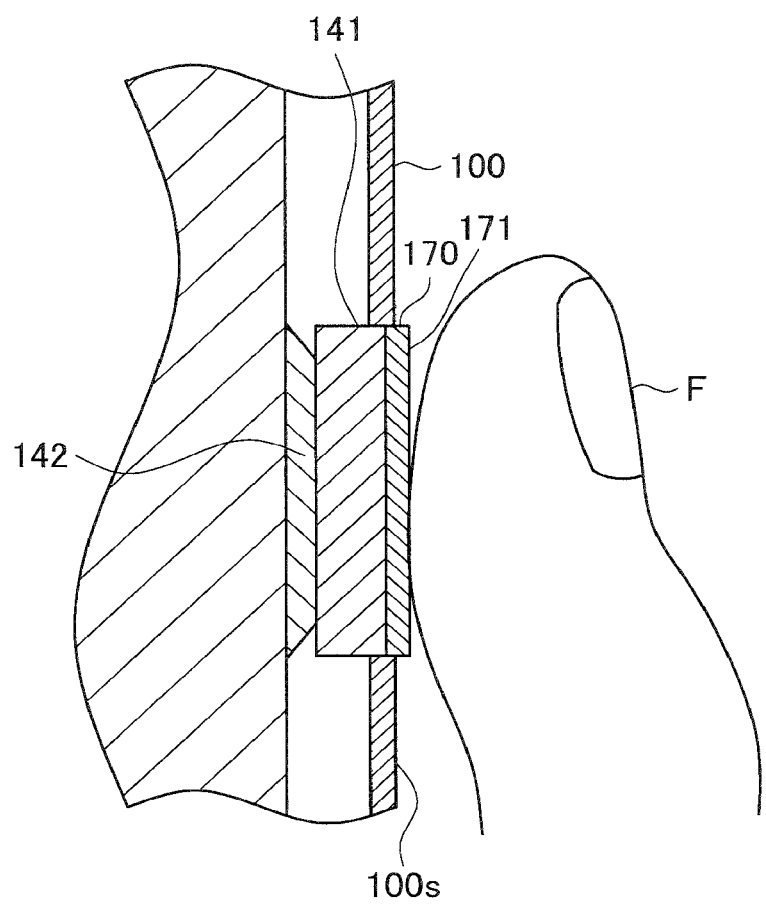
FIG. 3 is a diagram illustrating an example of a configuration of a fingerprint reader of a terminal device according to an embodiment of the present disclosure.

FIG. 2 and FIG. 3 are each a diagram illustrating configurations of the power button 141 and the fingerprint reader 170. FIG. 2 is a diagram illustrating a touch operation (to be described later), and FIG. 3 is a diagram illustrating a push operation (to be described later). With reference to FIG. 2 and FIG. 3, the configurations of the power button 141 and the fingerprint reader 170 will be described while an outside of the housing is considered as a top side and an inner side of the housing is considered as a bottom side. As illustrated in FIG. 2 and FIG. 3, a detection surface 171 configured to detect a fingerprint is installed on a top surface of the power button 141. In addition, the detection surface 171 and the power button 141 are disposed such that a center line of the power button 141 and a center line of the detection surface 171 substantially match with each other.

According to the above described configurations, when the fingerprint reader 170 is pressed, the power button 141 under the fingerprint reader 170 is pressed, a power switch 142 is turned on, and the terminal device 100 is powered on. Alternatively, the status of the terminal device 100 is changed from a sleep state in which functions of the terminal device 100 are limited to a state in which a lock screen is displayed on the display 120. In the lock screen, operations performed by a user on the terminal device 100 are limited.

In addition, the user can perform a fingerprint image registration operation and a fingerprint image matching operation by touching the fingerprint reader disposed on the power button 141 with his/her finger F. Movements of the finger F at a time when the fingerprint reader 170 reads a fingerprint are divided into the touch operation and the push operation.

FIG. 2 is the diagram illustrating the touch operation. The touch operation is an operation in which the finger F touches the detection surface 171 of the fingerprint reader 170. In the touch operation, press force of the finger F on the detection surface 171 is weaker than the push operation (to be described later). In the touch operation, the fingerprint reader 170 reads an image of a fingerprint (hereinafter, also referred to as "fingerprint image") in a state in which the power button 141 (or power switch 142) is not pressed. The finger print may be registered by the touch operation. Since the touch operation is easy for a user, the user can relatively easily perform a fingerprint registration process or a fingerprint authentication process multiple times. When a fingerprint is registered on the terminal device 100 for the first time, a user may register a fingerprint multiple times. In such a case, the user can register the fingerprints relatively easily by performing the touch operation to carry out the fingerprint registration process. In the fingerprint registration process, characteristics of a fingerprint image read through the touch operation are registered.

Next, the push operation will be described. FIG. 3 is the diagram illustrating the push operation. The push operation is an operation of the finger F that pushes the detection surface 171 of the fingerprint reader 170 when a fingerprint is read. In the push operation, press force of the finger F on the detection surface 171 is stronger than the press force in the case of the touch operation.

In the push operation, the fingerprint reader 170 reads a fingerprint image in a state in which the power button 141 (or power switch 142) is pressed via the fingerprint reader 170. In the case when the terminal device 100 is in the sleep state when the fingerprint authentication starts, a user cancels the sleep state and causes the terminal device 100 to enter a state in which the fingerprint authentication process can be started. To cancel the sleep state, the user presses the power button 141.

For example, to start the fingerprint authentication, the user presses the power button 141 via the fingerprint reader 170. Thereby, the power switch 142 disposed under the power button 141 is pressed, and the terminal device 100 enters a state in which it is possible to start the authentication operation. Subsequently, the authentication is performed by matching the characteristics of the fingerprint image read through the push operation with characteristics of a registered fingerprint image.

As described above, in the terminal device 100 according to the embodiment, the push operation may turn on the power switch 142 (or cancel sleep state) and start the fingerprint authentication operation at the same time. Thereby, the user can cancel the sleep state and perform the fingerprint authentication operation at the same time by the single operation. In addition, the terminal device 100 may be unlocked or the sleep state may be canceled by an operation of an operation key other than the power button 141. In addition, the power button 141 does not have to be disposed, and it is also possible that the fingerprint reader 170 directly presses the power switch 142.

<1-2. Internal Configuration of Terminal Device>

Figure 4:
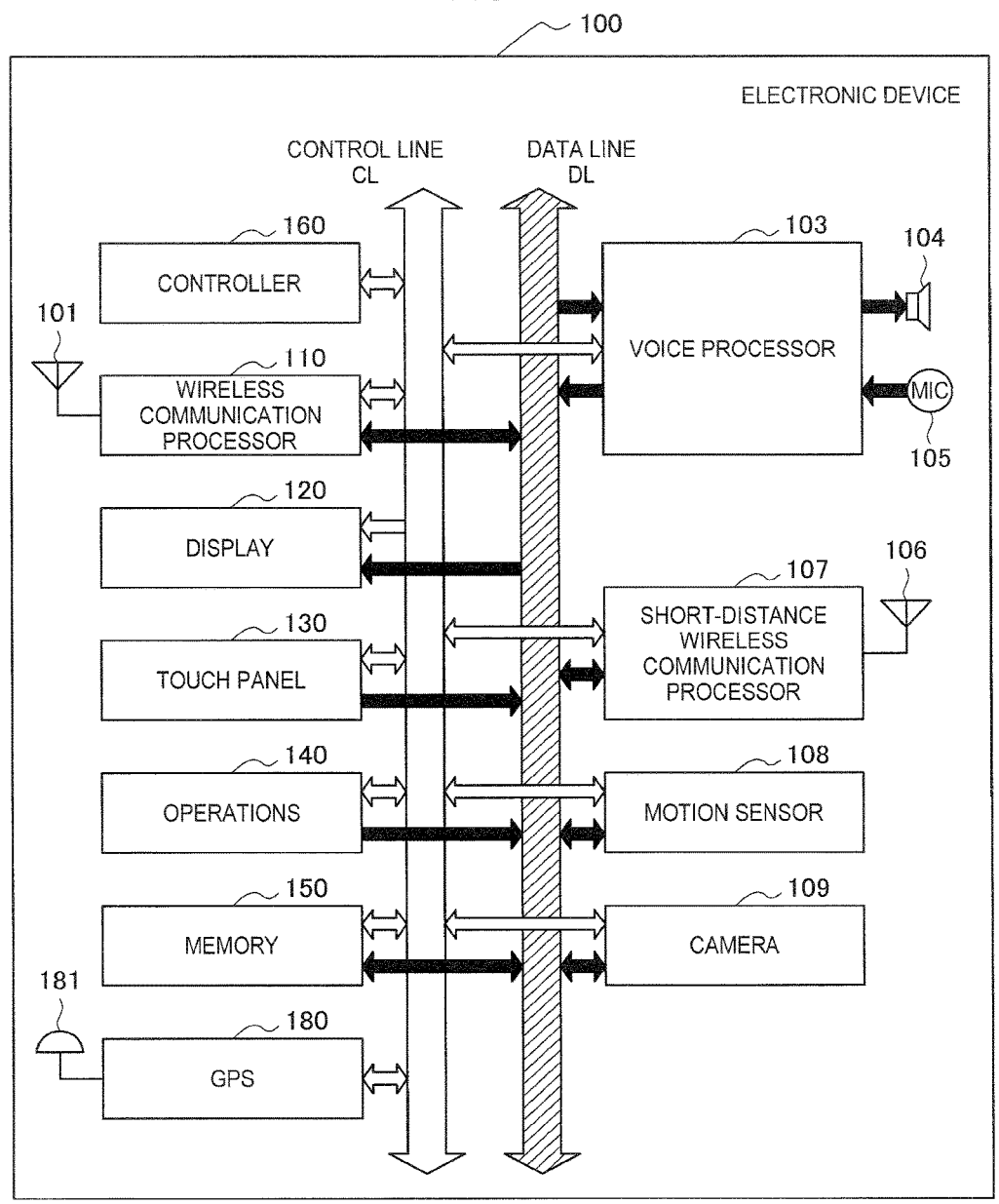
FIG. 4 is a block diagram illustrating an example of a configuration of a terminal device according to an embodiment of the present disclosure.

The summary of the terminal device 100 has been described above. Next, the internal configuration of the terminal device 100 will be described. FIG. 4 is a block diagram illustrating the internal configuration of the terminal device 100.

As illustrated in FIG. 4, the terminal device 100 includes a controller 160, a wireless communication processor 110, the display 120, the touch panel 130, an operation key 140, memory 150, and a GPS 180. The terminal device 100 further includes a voice processor 103, a speaker 104, a microphone 105, a short-distance wireless communication processor 107, a motion sensor 108, a camera 109, and antennas 101, 106, and 181.

The controller 160 transmits a control command to the wireless communication processor 110 via a control line CL. In addition, the controller 160 reads a program (software) stored in the memory 150 via the control line CL. Subsequently, the controller 160 controls the respective structural elements in the terminal device 100 by executing the read program. In addition, the controller 160 executes a fingerprint authentication program stored in the memory 150 and performs a fingerprint registration process or a fingerprint authentication process. The controller 160 may have functions as a characteristic extraction unit and a matching unit. The characteristic extraction unit extracts characteristics of a fingerprint, and the matching unit matches fingerprints. For example, the controller 160 is implemented by a central processing unit (CPU) or the like. In addition, the controller 160 may have a function as a detector configured to detect start of the authentication process. The controller 160 may further have a function as a display controller configured to cause the lock screen, an authentication process screen, and a home screen (that are to be described later) to be displayed. Display elements to be created by the display controller include an UI, character strings, images (moving image and still image), windows, icons, and the like. The UI is used for operations.

The wireless communication processor 110 performs wireless signal transmission/reception processes under the control of a controller 160. In addition, the terminal device 100 includes the antenna 101 configured to perform wireless communication with a base station. The antenna 101 is connected with the wireless communication processor 110.

In the case when the terminal device 100 performs data communication or transmits/receives e-mails via a network such as the Internet, the wireless communication processor 110 may perform the transmission/reception processes under the control of the controller 160. For example, data is received by the wireless communication processor 110 and stored in the memory 150, and a display process or the like based on the stored data is performed under the control of the controller 160. In addition, the data stored in the memory 150 is supplied to the wireless communication processor 110 and transmitted in a wireless manner.

The memory 150 stores prepared data such as the program and data created by a user operation. The data is stored into the memory 150 and read from the memory 150 under the control of the controller 160.

The voice processor 103 performs a demodulation process on the supplied voice data, and obtains an analog voice signal. The voice data supplied to the voice processor 103 may be voice data during a call received by the wireless communication processor 110. At this time, the wireless communication processor 110 supplies the voice data to the voice processor 103 via a data line DL. The analog voice signal obtained by the voice processor 103 is supplied to a speaker 104, and the speaker 104 outputs voice.

In addition, the voice processor 103 converts the voice signal output from the microphone 105 into voice data in a transmission format. Subsequently, the voice data converted by the voice processor 103 is supplied to the wireless communication processor 110 via the data line DL. In addition, the voice data supplied to the wireless communication processor 110 is packetized and transmitted in a wireless manner.

In the case when the terminal device 100 does not include a voice call function, the voice processor 103, the speaker 104, and the microphone 105 may be omitted.

Under the control of the controller 160, the display 120 displays the lock screen, the authentication process screen, and the home screen on a display panel, and displays various kinds of information and images constituting the lock screen, the authentication process screen, and the home screen. For example, a liquid crystal display panel or an organic electro-luminescence (EL) display panel is used as the display panel.

When an object such as a finger or a pen touches a surface (detection surface) of the display panel, the touch panel 130 detects a touch position. For example, the touch panel 130 detects that the finger or the pen has touched an area of the display panel in which an image or the like is displayed. The touch panel 130 may be stacked on or integrated with the display panel. For example, the touch panel 130 may be an electrostatic capacity type touch panel. In this case, the touch of the finger or the like to the surface of the display panel is detected by change in electrostatic capacity.

Data about the touch position detected by the touch panel 130 is transmitted to the controller 160. The controller 160 executes an activated application on the basis of the transmitted data about the touch position. For example, the touch position is indicated by a position in coordinates of two perpendicular axes (x axis (horizontal axis) and y axis (vertical axis)). The number of positions in coordinates detected by the touch panel 130 is not limited to one. In the case when multiple points have been touched at the same time, the controller 160 performs control based on the multiple points that have been detected. In addition, the controller 160 detects an entire range that has been touched when wide ranges on the touch panel 130 have been touched at the same time.

In addition, the terminal device 100 includes the operation key 140 such as the power switch 142. Operation information of the operation key 140 is transmitted to the controller 160. On a surface of the operation key 140, the fingerprint reader 170 configured to read a surface (fingerprint) of a touching finger may be disposed. The fingerprint reader 170 may read the fingerprint of the finger touching the detection surface disposed thereon, and transmit a read image to the controller 160. In addition, the fingerprint reader 170 stores the read image in the memory 150. The fingerprint reader 170 is implemented by multiple sensor elements disposed in a two-dimensional array form. For example, as the fingerprint reader 170, an optical fingerprint reader, an electrical field intensity measurement type fingerprint reader, an electrostatic capacity type fingerprint reader, or the like can be used.

The GPS 180 acquires the position of the terminal device 100 by performing triangulation based on information included in radio waves transmitted from a satellite. The GPS 180 is connected with the antenna 180 configured to receive the radio waves from the satellite.

The short-distance wireless communication processor 107 is used for short-distance wireless communication with another terminal. For example, the short-distance wireless communication method may be Wi-Fi, Bluetooth (registered trademark), ZigBee (registered trademark), or the like. The short-distance wireless communication processor 107 is connected with the antenna 106 configured to transmit and receive radio waves to/from another device.

The motion sensor 108 is used for detecting movement or an attitude of the terminal device 100. For example, the motion sensor 108 may detect acceleration of the terminal device 100 by using an acceleration sensor. Alternatively, the motion sensor 108 may detect angular acceleration or angular velocity of the terminal device 100 by using a gyro sensor. The camera 109 is used for capturing images.

The terminal device 100 includes a power source (battery) that is not illustrated. The respective blocks in the terminal device 100 are driven by electric power supplied from the power source.

<1-3. Program that Operates in Terminal Device>

Figure 5:
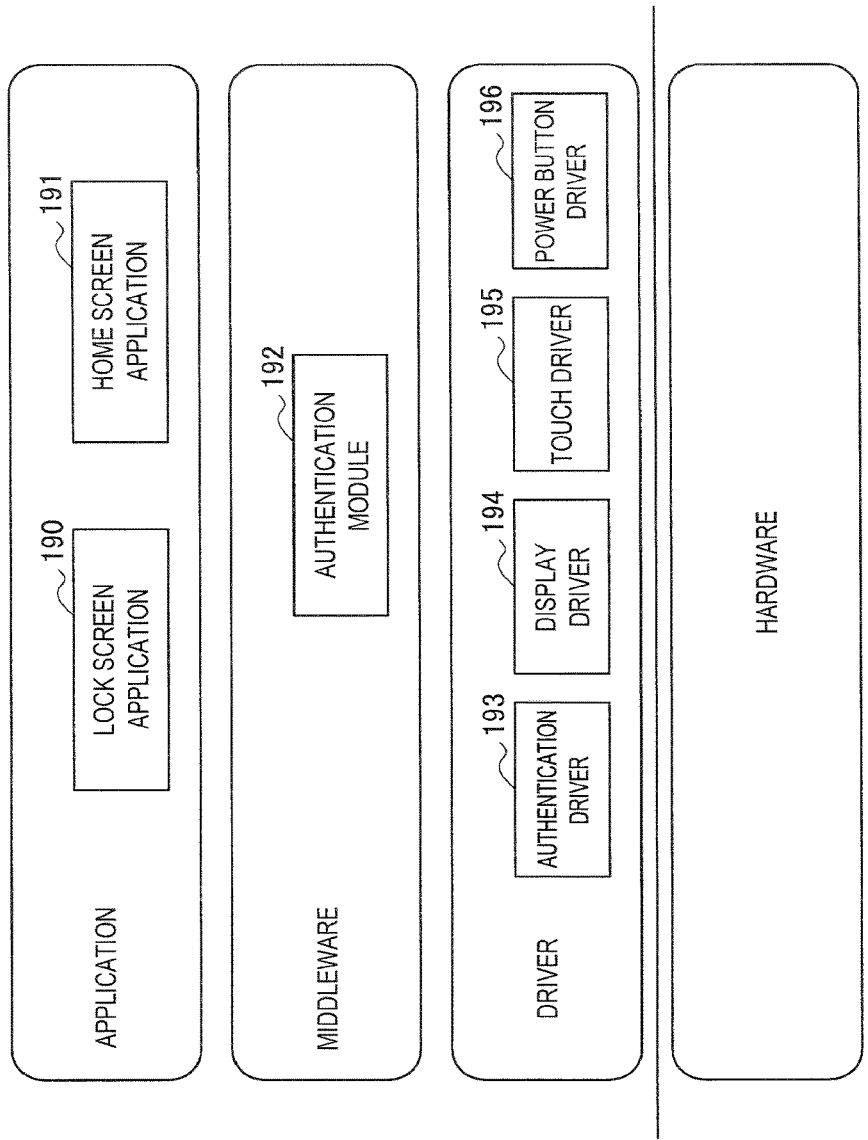
FIG. 5 is a diagram illustrating an example of a configuration of a program that operates in a terminal device according to an embodiment of the present disclosure.

The internal configuration of the terminal device 100 has been described above. Next, a program that operates in the terminal device 100 will be described. FIG. 5 is a diagram illustrating an example of the program that operates in the terminal device 100 according to the embodiment. As illustrated in FIG. 5, drivers, middleware, and applications operate in the terminal device 100. The drivers provide interfaces with hardware, the middleware provides an interface with higher function, and the applications provide various UIs.

The drivers include an authentication driver 193, a display driver 194, a touch driver 195, and a power button driver 196. The authentication driver 193 provides an interface with hardware for the authentication process (such as fingerprint sensor). The display driver 194 provides an interface with hardware for achieving a display function of the display 120 (such as liquid crystal panel). The touch driver 195 provides an interface with hardware for achieving an operation receiving function of the touch panel 130. The power button driver 196 provides an interface with hardware for achieving a function to detect operation performed on the power button 141.

The middleware includes an authentication module 192. For example, the authentication module 192 performs the authentication process on the basis of information obtained from the authentication driver 193.

The applications include a lock screen application 190 and a home screen application 191. The lock screen application 190 is an application for displaying the lock screen and the authentication process screen. The home screen application 191 is an application for displaying the home screen.

<1-4. Fingerprint Authentication Process in Terminal Device>

The configuration of the terminal device 100 and the program that operates in the terminal device 100 have been described above. Next, a fingerprint authentication process to be executed in the terminal device 100 will be described.

Figure 6:
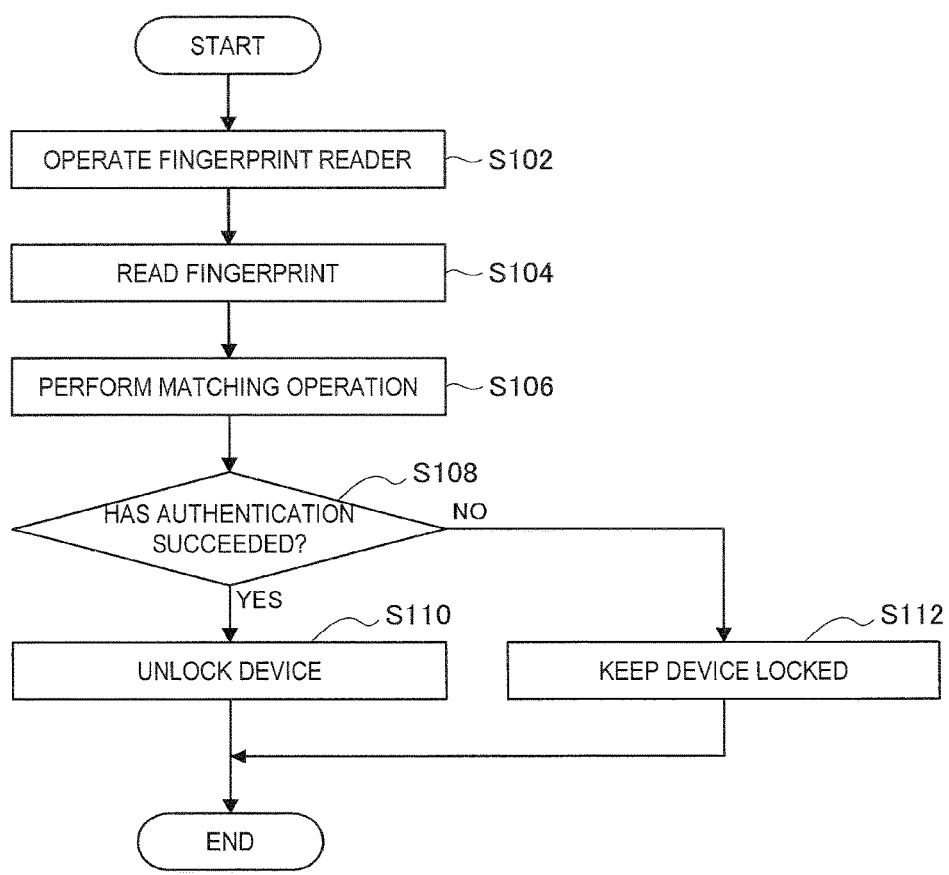
FIG. 6 is a flowchart illustrating an example of a process to be executed in a terminal device according to an embodiment of the present disclosure.

In the case when press on the power switch 142 activates a matching function of the fingerprint authentication that operates in the terminal device 100, a process illustrated in FIG. 6 is performed. FIG. 6 is a flowchart illustrating the fingerprint authentication process to be executed in the terminal device 100.

First, in S102, when a user presses the power switch 142 by his/her finger via the fingerprint reader 170, the controller 160 operates the fingerprint reader 170. At this time, the finger is put on the detection surface 171 of the fingerprint reader 170 in a state where the finger is pressing the detection screen 171. In S104, the controller 160 causes the fingerprint reader 170 to read the fingerprint of the finger put on the detection screen 171. Subsequently, the controller 160 stores an image of the read fingerprint in the memory 150 as a fingerprint image of a matching target.

Next, in S106, the controller 160 extracts characteristics of the fingerprint image of the matching target. Subsequently, the controller 160 performs a fingerprint matching operation by comparing the extracted characteristics of the fingerprint image of the matching target with characteristics of a registered fingerprint image.

In S108, the controller 160 performs the authentication process on the basis of a result of the matching. For example, it is possible to determine whether characteristics of two fingerprint images of comparison targets match with each other, on the basis of an amount of matched characteristics, that is, the number of matched characteristic points. Here, a minutia method may be used as a method for extracting the characteristic points. The controller 160 determines that the two fingerprints of the comparison targets match with each other in the case when the number of the matched characteristic points is more than or equal to a predetermined threshold. In addition, a pattern matching method or a frequency analysis method may be used as the matching method. In the pattern matching method, it is determined whether patterns of the fingerprint images match with each other. In the frequency analysis method, it is determined whether the fingerprints match with each other by converting the fingerprint images into frequencies.

In the case when the controller 160 determines that the fingerprints match with each other in S108, the process proceeds to S110, and the controller 160 unlocks the terminal device 100. On the other hand, in the case when the controller 160 determines that the fingerprints do not match with each other in S108, the process proceeds to S112, and the controller 160 keeps the terminal device 100 locked.

2. Method for Displaying Authentication Process Screen

The authentication process to be executed in the terminal device 100 has been described above. Next, an authentication process screen to be displayed in the terminal device 100 according to the embodiment will be described. As described above, the terminal device 100 according to the embodiment displays the authentication process screen during the authentication process to inform a user that the authentication process is going on.

Figure 7:
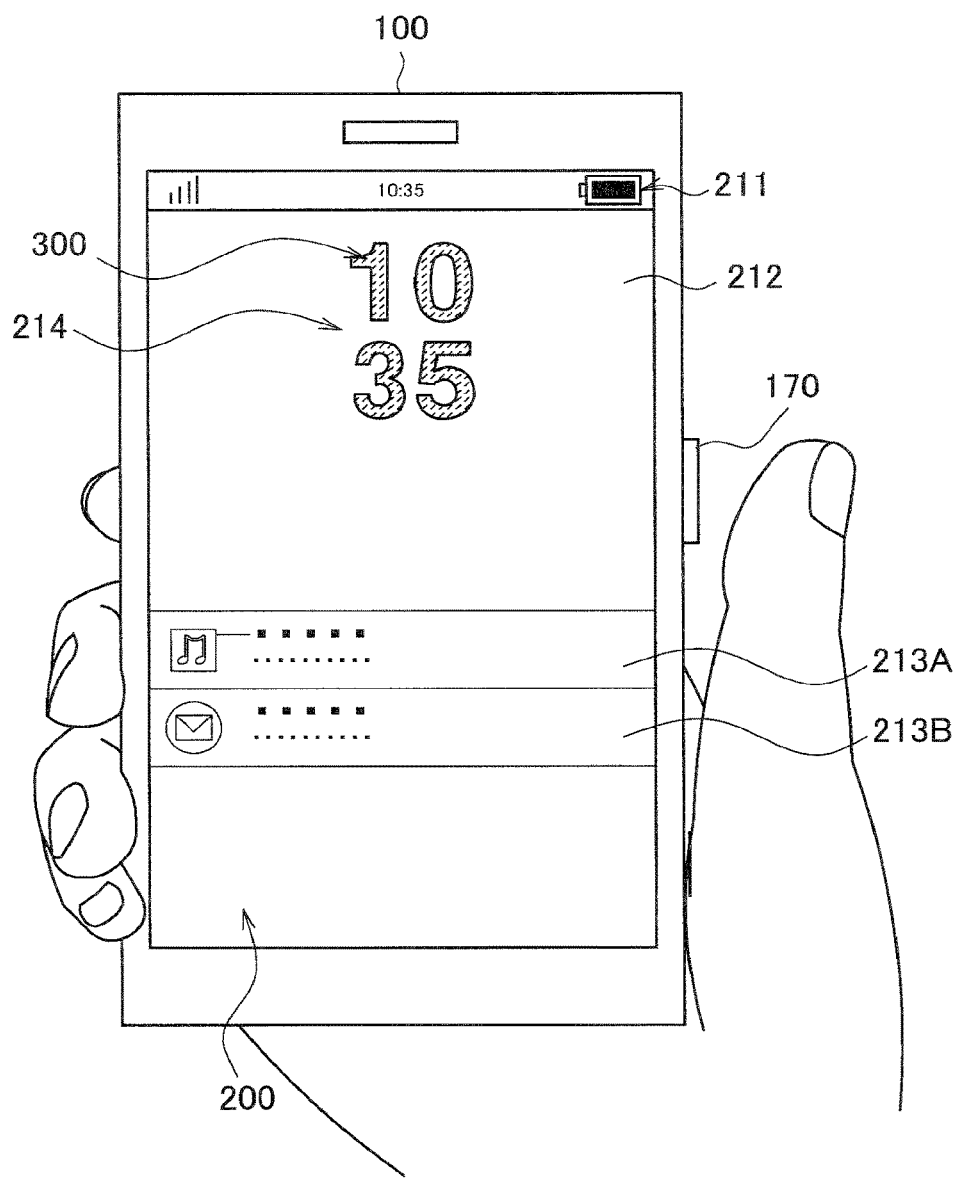
FIG. 7 is a diagram illustrating an example of a display screen in a terminal device according to an embodiment of the present disclosure.

FIG. 7 is a diagram illustrating a lock screen 200 displayed before the authentication process starts. The lock screen 200 receives user operations for authentication, but does not receive operations other than the operations for the authentication. In the lock screen 200, a user can briefly check information. For example, in the example illustrated in FIG. 7, signal strength, remaining battery charge, and the like are displayed in a header region 211, a background image including clock display 214 is displayed in a background region 212, and widgets 213 are displayed such that the widgets 213 are overlapping the background region 212. Here, as illustrated in FIG. 7, parts of a background image of a home screen 300 (to be described later) may be displayed on number symbols of the clock display 214.

Hereinafter, the background image of the lock screen 300 is a diagonal dashed line image. The widgets 213 are UI elements indicating statuses of applications operating in the terminal device 100. In the example illustrated in FIG. 7, the widgets 213 include a status display 213A of a music application and a status display 213B of an e-mail application.

In FIG. 7, no finger of the user touches the fingerprint reader 170, and therefore the fingerprint authentication process is not going on in the terminal device 100.

Figure 8:
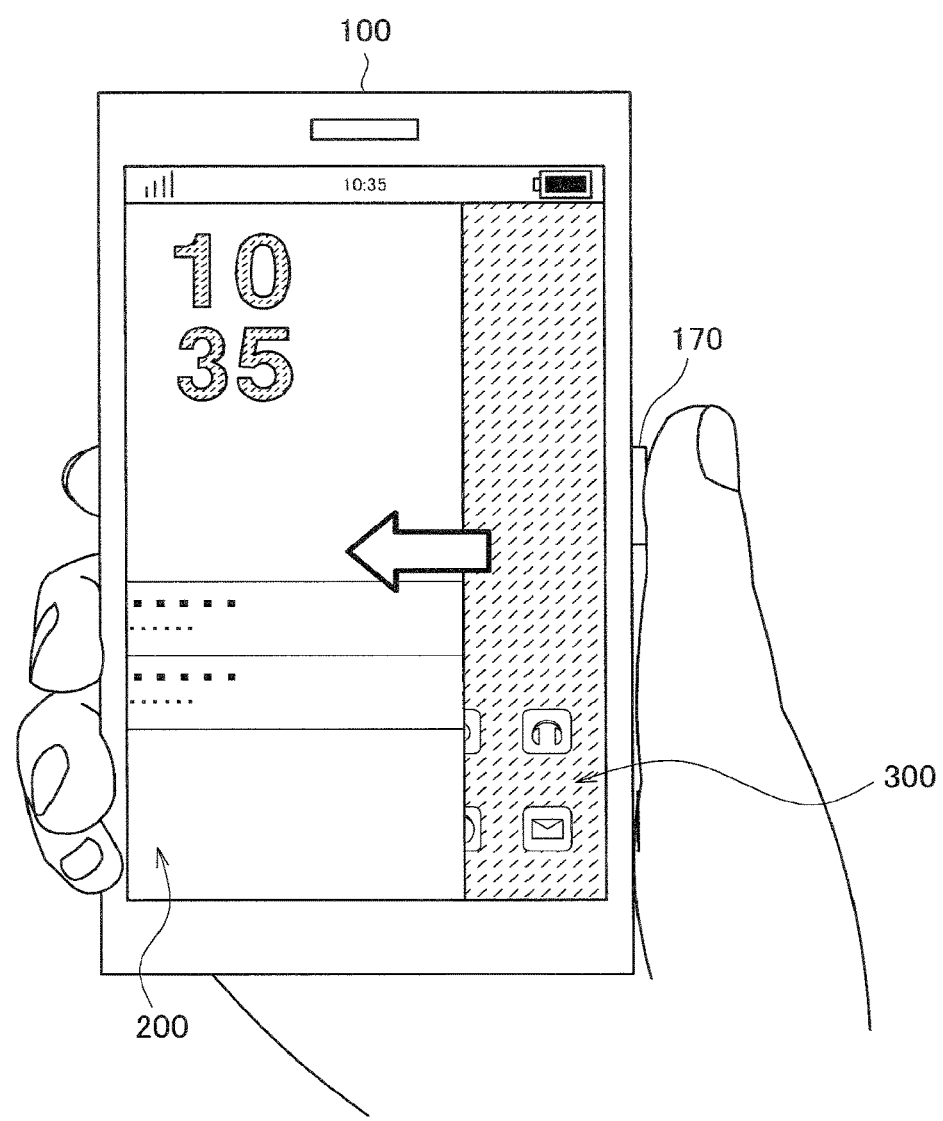
FIG. 8 is a diagram illustrating an example of a display screen in a terminal device according to an embodiment of the present disclosure.

FIG. 8 is a diagram illustrating an authentication process screen indicating that the authentication process is going on. Hereinafter, description will be given with reference to FIG. 8 while a side surface on which the fingerprint reader 170 is disposed in the terminal device 100 is considered as a right side, and a side surface facing to the side surface on which the fingerprint reader 170 is disposed in the terminal device 100 is considered as a left side.

In the case when a finger of a user is put on the fingerprint reader 170 as illustrated in FIG. 8, the controller 160 recognizes that an object is touching the detection surface 171 of the fingerprint reader 170. Subsequently, the controller 160 slides the lock screen 200 displayed on the display 120 to the left side (in direction of arrow in FIG. 8). In addition, the controller 160 partially displays the home screen 300 that is displayed after the authentication process succeeds, in an empty space that has been created by sliding the lock screen 200. Here, the partially displayed home screen 300 may include the background image, and images of icons, clock display, and widgets that are included in the home screen 300.

In FIG. 8, the thumb of the user moves from the right to the left, and the thumb touches the detection surface 171 of the fingerprint reader 170. Therefore, the controller 160 performs display control such that the lock screen 200 slides to the left in accordance with the thumb moving direction (left). In other words, display control is performed such that the lock screen 200 slides in a direction perpendicular to the side surface on which the fingerprint reader 170 is disposed. Therefore, for example, as described later with reference to FIG. 20 and FIG. 21, in the case when the fingerprint reader 170 is disposed on the back surface of the housing, the display control may be performed so as to show an effect as if the lock screen 200 is pressed from the rear side to the front side in accordance with user movement of touching the back surface of the housing. In addition, for example, as described later with reference to FIG. 23 and FIG. 24, in the case when the fingerprint reader 170 is disposed on a lower side of the housing, the display control may be performed such that the lock screen 200 slides from the bottom to the top in accordance with the movement of a finger of a user touching the lower side of the housing.

Due to such display control, the user operation by his/her finger matches with change in the screen in view of their moving direction. Therefore, the user can intuitively understand that the authentication process is going on. In addition, the user can feel as if the lock screen 200 has slid by the user pressing the terminal device 100 (or fingerprint reader 170) with his/her finger.

As described above, the terminal device 100 according to the embodiment displays the authentication process screen indicating that the authentication process is going on by sliding the lock screen 200 and displaying the lock screen 200 and the home screen 300 in different regions. Due to such a display process, the terminal device 100 according to the embodiment visually informs a user that the fingerprint authentication process has started. Therefore, the user can easily recognize that the authentication process is going on.

Figure 9:
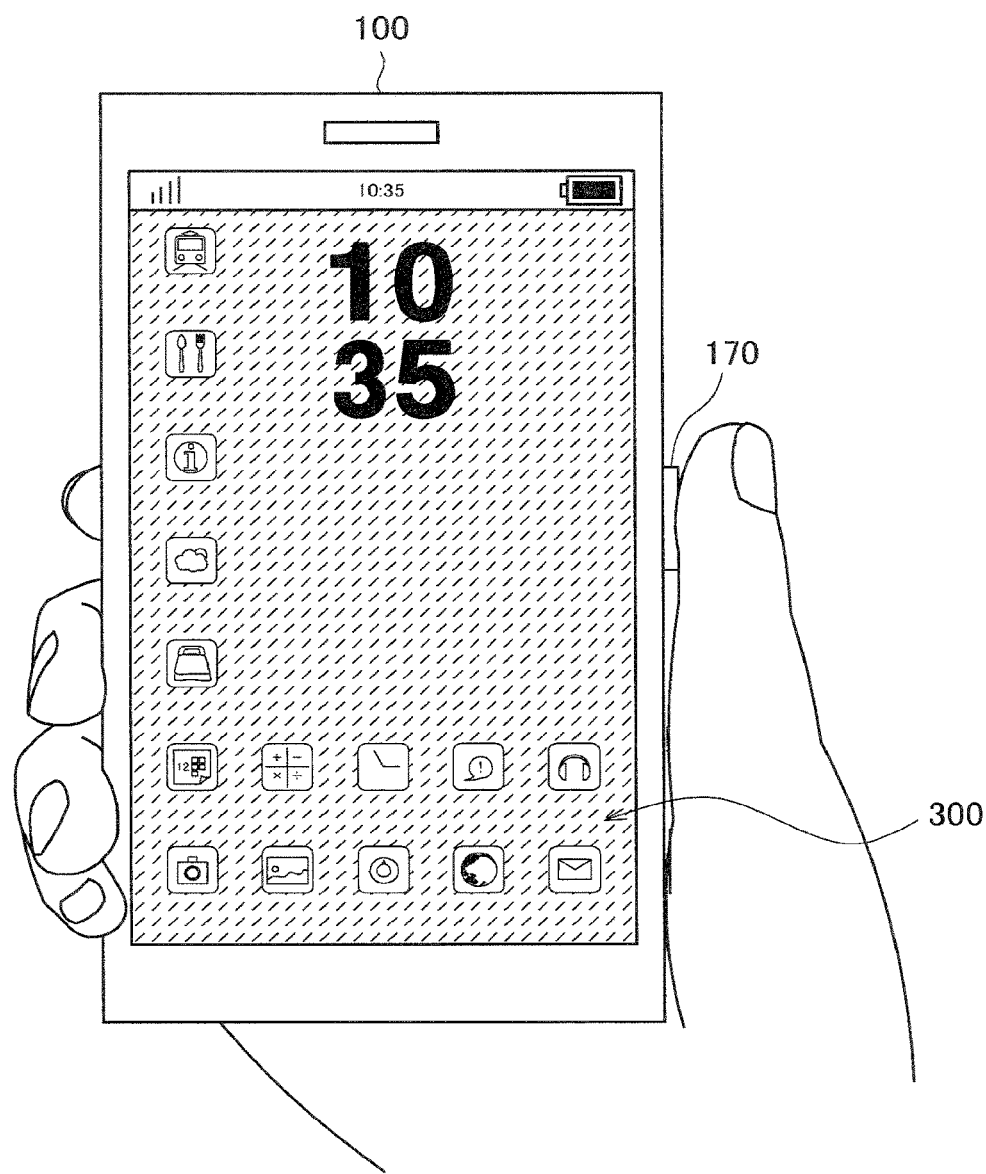
FIG. 9 is a diagram illustrating an example of a display screen in a terminal device according to an embodiment of the present disclosure.

FIG. 9 is a diagram illustrating the home screen 300 displayed in the case when the authentication process has succeeded. In the case when the authentication process has succeeded, the controller 160 slides the lock screen that has slid to the left side, to the further left from the position illustrated in FIG. 8. Next, the controller 160 completely replaces the lock screen 200 with the next screen (home screen 300) and unlocks the terminal device 100.

As illustrated in FIG. 9, the home screen 300 may include the background image with the diagonal dashed lines and icons for activating applications. The home screen 300 may further include clock display or widgets.

Figure 10:
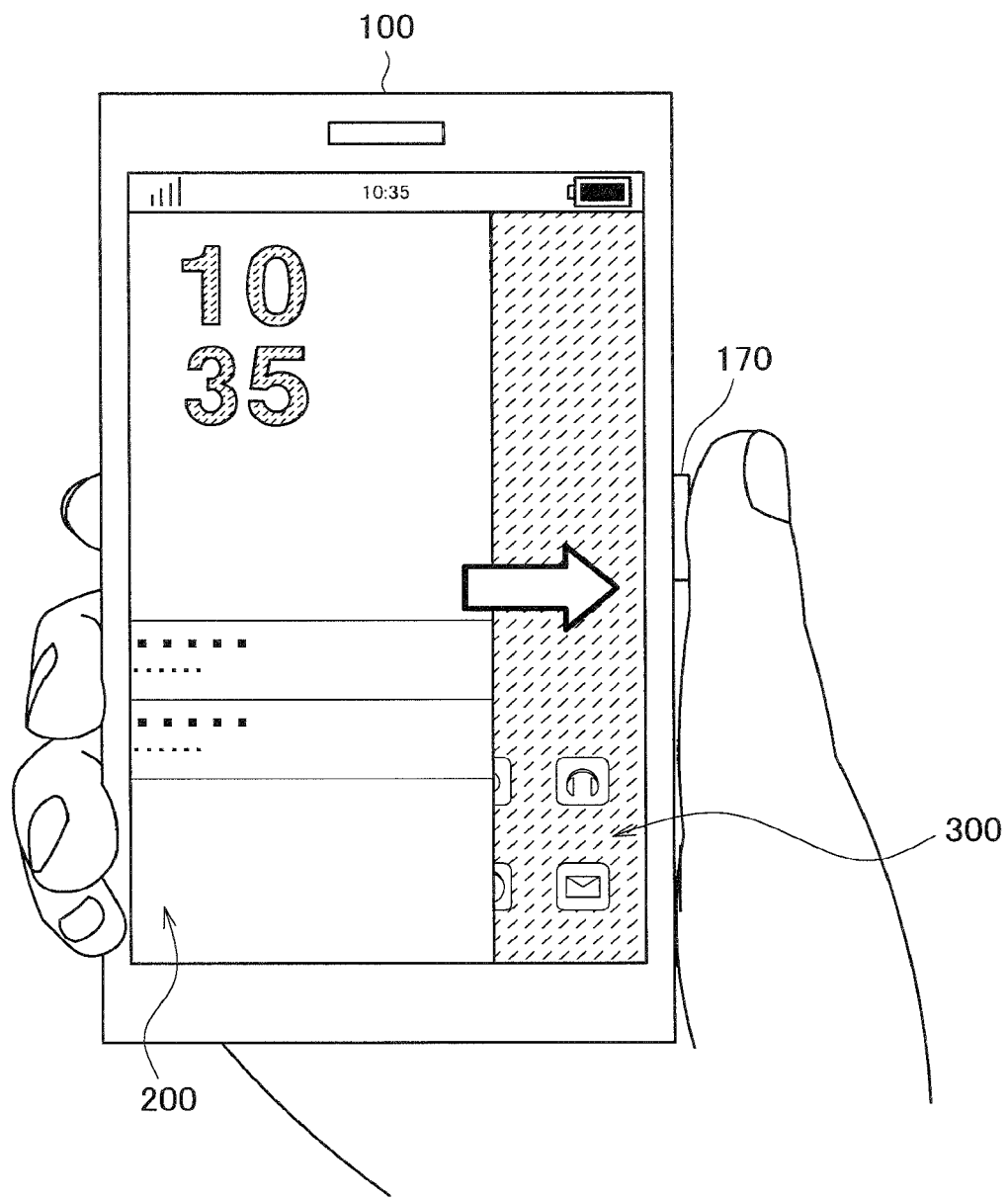
FIG. 10 is a diagram illustrating an example of a display screen in a terminal device according to an embodiment of the present disclosure.

FIG. 10 is a diagram illustrating transition of a screen in the case when the authentication process has failed. When the authentication process fails, the controller 160 slides the lock screen 200 that has slid to the left side in FIG. 8 to the right side and brings back the initial lock screen 200 illustrated in FIG. 7. Due to such a display process, the terminal device 100 according to the embodiment visually informs a user that the authentication process has failed. Therefore, the user can easily recognize that the authentication process has failed.

In a similar way, in the case when the user removes his/her finger from the fingerprint reader 170 before the fingerprint authentication process finishes, the controller 160 performs display process such that the lock screen 200 that has been slid to the left side in FIG. 8 slides to the right side and the initial lock screen illustrated in FIG. 7 is brought back.

Figure 11:
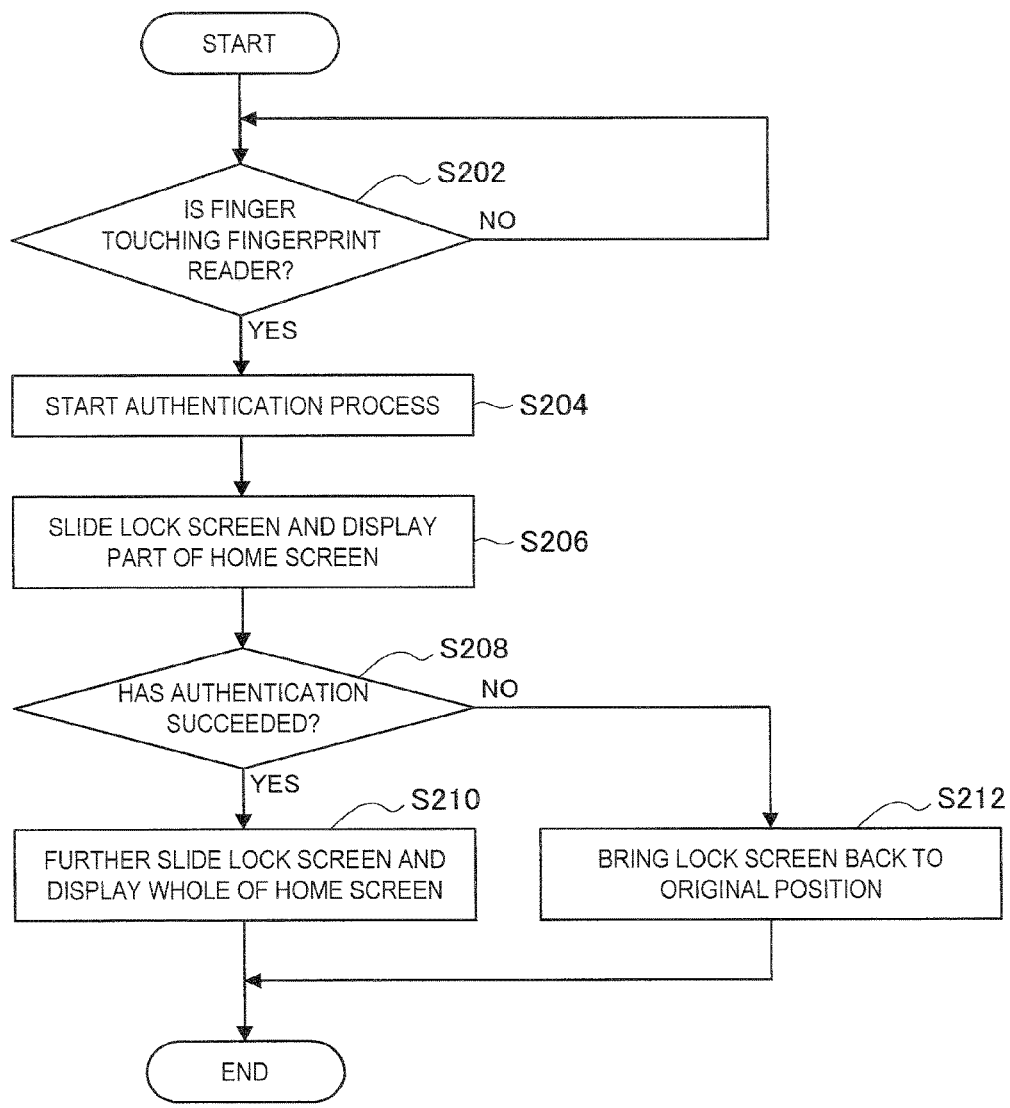
FIG. 11 is a flowchart illustrating an example of a process to be executed in a terminal device according to an embodiment of the present disclosure.

FIG. 11 is a flowchart illustrating display control of screens during the authentication process. First, in S202, the controller 160 determines whether or not a finger is touching the fingerprint reader 170. When the controller 160 determines that the finger is touching the fingerprint reader 170, the process proceeds to S204.

In S204, the controller 160 starts the authentication process. The authentication process to be executed here is the same as the process of S104 and S106 in FIG. 6. When the authentication process starts, the controller 160 displays the authentication process screen indicating that the authentication process is going on, by sliding the lock screen 200 and displaying a part of the home screen 300 in S206.

In the case when the authentication process has succeeded in S208, the process proceeds to S210. In S210, the controller 160 further slides the lock screen 200 in the direction in which the lock screen 200 has been slid in S206. Next, the controller 160 finally displays the whole of the home screen 300. At this time, the controller 160 unlocks the terminal device 100 in response to the success in the authentication process.

In the case when the authentication process has failed in S208, the process proceeds to S212. In S212, the controller 160 slides the lock screen 200 in a direction opposite to the direction in which the lock screen 200 has been slid in S206. Next, the controller 160 returns to the state where the whole of the lock screen 200 is displayed. At this time, the controller 160 keeps the terminal device 100 locked.

In the above described example, the next screen to which the lock screen 200 transitions after the authentication process succeeds is the home screen 300. However, the next screen to which the lock screen 200 transitions is not limited to the home screen 300. For example, the next screen to which the lock screen 200 transitions may be an application execution screen. In this case, parts of the application execution screen may be displayed in the regions in which parts of the home screen 300 are displayed in FIG. 8.

3. First Modified Embodiment

The example in which a part of the home screen 300 is displayed in the empty space that has been created by sliding the lock screen 200 in the authentication process screen during the authentication process has been described above. Next, another example of the authentication process screen will be described. In a first modified embodiment, an example in which the lock screen 200 has a colored background image will be described.

Figure 12:
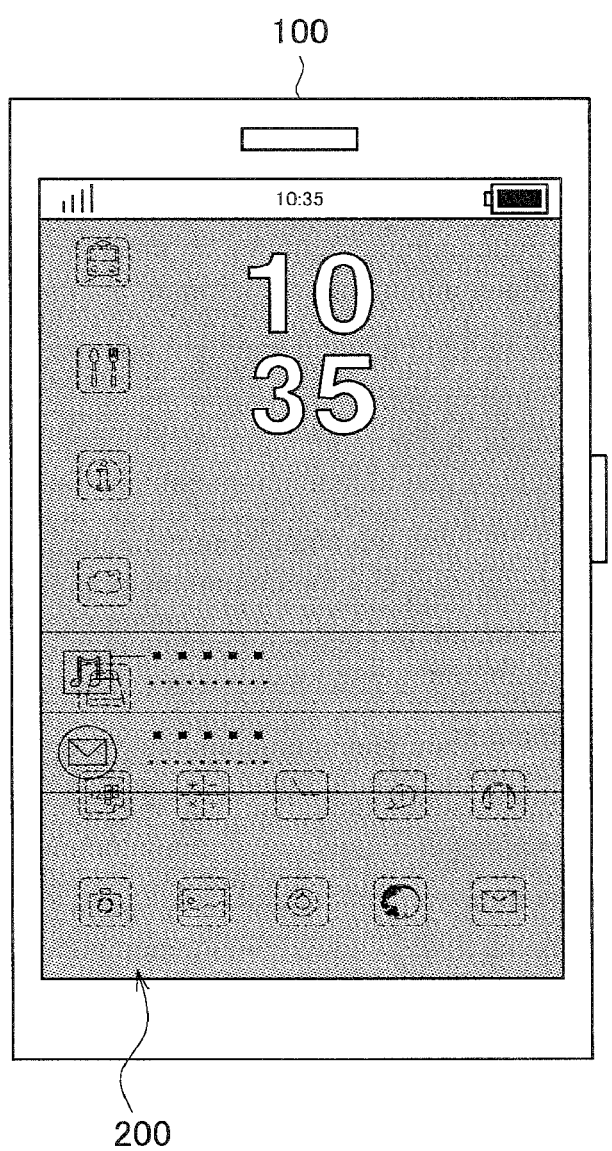
FIG. 12 is a diagram illustrating an example of a display screen in a terminal device according to an embodiment of the present disclosure.
Figure 13:
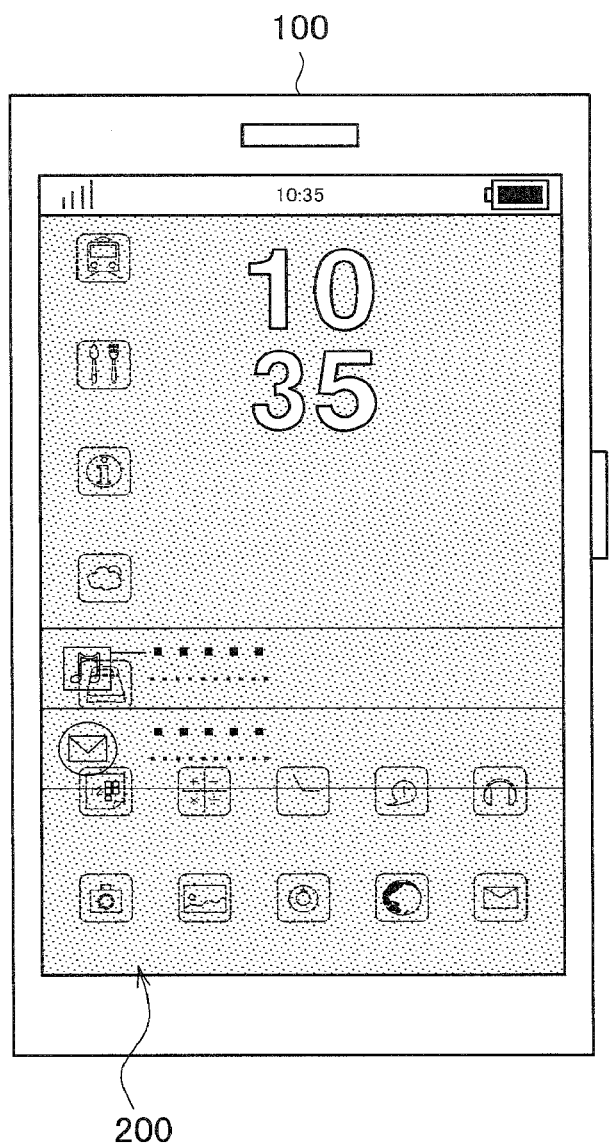
FIG. 13 is a diagram illustrating an example of a display screen in a terminal device according to an embodiment of the present disclosure.

FIG. 12 and FIG. 13 are each a diagram illustrating the first modified embodiment of the authentication process screen. According to the first modified embodiment, an image obtained by blurring an image of the next screen (home screen 300) to which the lock screen 200 transitions in the case when the authentication process has succeeded is used as the authentication process screen. A blurring process using a Gaussian filter or the like may be used as the process for blurring images. In addition, an image of the lock screen 200 with lightened color may be used in the authentication process screen according to the first modified embodiment. The controller 160 performs display control such that the home screen 300 is displayed behind the translucent lock screen 200 by displaying an image obtained by combining the home screen 300 subjected to the blurring process with the lock screen 200 with lightened color. In FIG. 12 and FIG. 13, the hatched lock screen 200 is displayed, and the home screen 300 is displayed behind the hatched lock screen 200 that is translucent. In FIG. 12 and FIG. 13, the image constituting the home screen 300 is illustrated with dotted lines. In addition, in FIG. 12 and FIG. 13, a degree of the blurring process performed on the image constituting the home screen 300 is represented by using intervals between the dots. In other words, a strong blurring process is performed on the image constituting the home screen 300 in the case when the intervals between the dots are wide, and a weak blurring process is performed on the images constituting the home screen 300 in the case when the intervals between the dots are narrow.

Details of the authentication process screen illustrated in FIG. 12 and FIG. 13 will be described. When the authentication process starts in the first modified embodiment, the controller 160 performs display control such that the lock screen 200 illustrated in FIG. 7 transitions to the authentication process screen illustrated in FIG. 12. As described above, in the authentication process screen illustrated in FIG. 12, the home screen 300 is displayed behind the translucent lock screen 200. Since the authentication process screen is displayed in such a way, a user can recognize that the authentication process is going on.

Next, in the case when the authentication process has succeeded, the controller 160 reduces the degree of the blurring of the image of the home screen 300. In addition, the controller 160 further lightens the color of the lock screen 200. FIG. 13 is an example of a screen displayed after such a process. In the screen illustrated in FIG. 13, the controller 160 performs display control such that a user can see the home screen 300 through the lock screen 200 though the home screen 300 is still not clear.

After the display control for displaying the image illustrated in FIG. 13, the controller 160 further lightens the color of the lock screen 200, and further reduces the degree of the blurring process performed on the home screen 300. Thereby, the controller 160 performs display control such that the home screen 300 that is not subjected to the blurring process is finally displayed. This situation is the same as the situation illustrated in FIG. 9. In this situation, the controller 160 unlocks the terminal device 100.

In the case when the authentication process has failed, the controller 160 performs display control so as to bring the state illustrated in FIG. 12 back to the state in which the user sees no image behind the lock screen 200 (state illustrated in FIG. 7).

In a similar way, in the case when the finger of the user is removed from the fingerprint reader 170 before the authentication process finishes, the controller 160 may perform display control so as to bring the state illustrated in FIG. 12 back to the state in which the user sees no other screens behind the lock screen 200 (state illustrated in FIG. 7).

Figure 14:
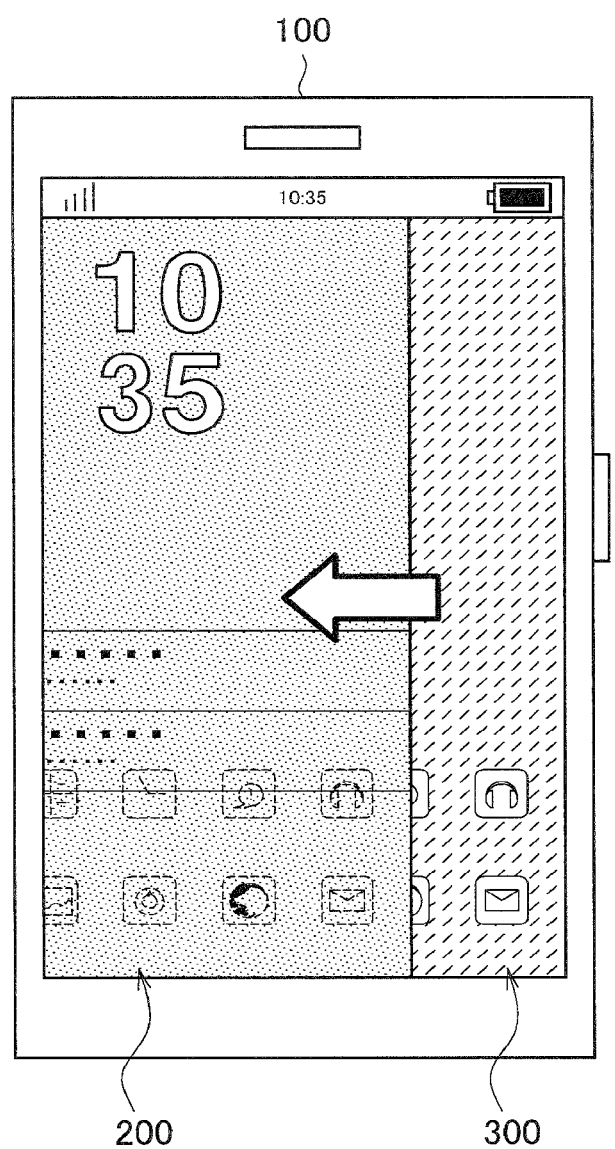
FIG. 14 is a diagram illustrating an example of a display screen in a terminal device according to an embodiment of the present disclosure.

It is also possible that the authentication process screen is displayed by combining the blurring process performed on the home screen 300 with the sliding of the lock screen 200. FIG. 14 is a diagram illustrating an authentication process screen obtained by combining the blurring process performed on the home screen 300 with the sliding of the lock screen 200.

According to the example illustrated in FIG. 14, in the case when a finger of a user is put on the detection surface 171 of the fingerprint reader 170, the controller 160 recognizes that the object is touching the detection surface 171, and slides the lock screen 200 displayed on the display 120 to the left side in response to the touch. In addition, the controller 160 performs display control such that an image obtained by blurring the home screen 300 is combined with an image obtained by lightening the color of the lock screen 200. In this case, color similar to the lock screen 200 is displayed in an empty space created by sliding the lock screen 200. Since the authentication process screen is displayed during the authentication process in such a way, the terminal device 100 can visually inform a user that the fingerprint authentication process has started.

In the case when the authentication process has succeeded, the controller 160 performs display control such that the lock screen 200 further slides to the left side. In addition to this process, the controller 160 performs display control such that the degree of the blurring process performed on the home screen 300 is reduced and the whole of the home screen 300 is clearly displayed. This situation is the same as the situation illustrated in FIG. 9.

In the case when the authentication process has failed, the controller 160 performs display control such that the lock screen 200 slides to the right side. In addition, the controller 160 may perform display control such that the lock screen 200 is returned to the initial state of the lock screen 200 illustrated in FIG. 7 by heightening the color of the lock screen 200.

The example in which the image obtained by combining the image obtained by blurring the image of the home screen 300 with the image of the lock screen 200 with lightened color is used has been described in the above example. However, as another technique, the screens may be configured such that an image for the lock screen 200 is disposed on a layer above the home screen 300, and screens similar to the authentication process screens in FIG. 12 to FIG. 14 are obtained by gradually increasing transparency of the image for lock screen 200. In this case, for example, the transparency of the image for the lock screen 200 illustrated in FIG. 12 is 30%, the transparency of the image for the lock screen 200 illustrated in FIG. 13 is 60%, and the transparency of the image for the lock screen 200 illustrated in FIG. 9 is 100%.

4. Second Modified Embodiment

Figure 15:
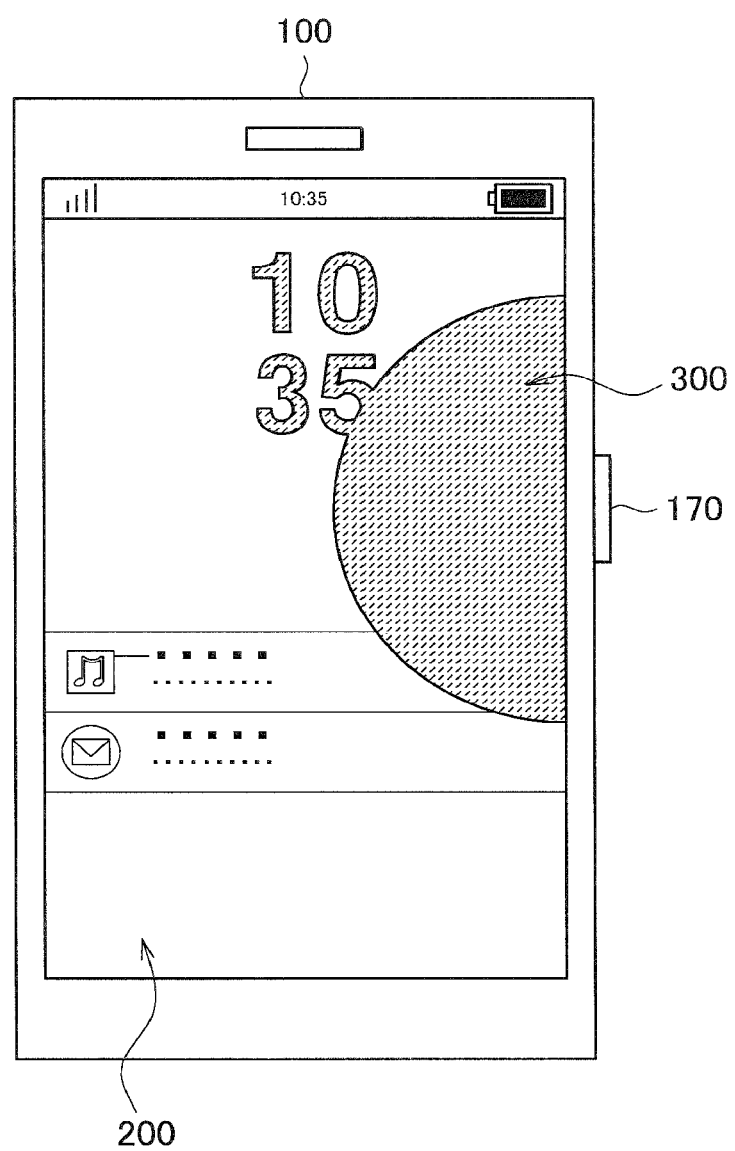
FIG. 15 is a diagram illustrating an example of a display screen in a terminal device according to an embodiment of the present disclosure.

The first modified embodiment of the authentication process screen has been described above. Next, a second modified embodiment of the authentication process screen will described. FIG. 15 is a diagram illustrating the second modified embodiment of the authentication process screen. According to the second modified embodiment, as illustrated in FIG. 15, a semicircle centered at a point close to the fingerprint reader 170 is drawn in a display screen in the case when the fingerprint authentication process has started. Subsequently, the controller 160 performs display control such that the image constituting the home screen 300 is displayed in the semicircle and the size of the semicircle gradually increases.

In the case when the authentication process has succeeded, the controller 160 performs display control such that the semicircle keeps enlarging and finally the whole of the home screen 300 is displayed. On the other hand, in the case when the authentication process has failed, the controller 160 performs display control such that the semicircle shrinks and the initial lock screen 200 (state illustrated in FIG. 7) is displayed. As described above, the terminal device 100 according to this modified embodiment draws a figure in the display screen, displays an image constituting the home screen 300 in the figure, and displays the authentication process screen.

5. Third Modified Embodiment

Figure 16:
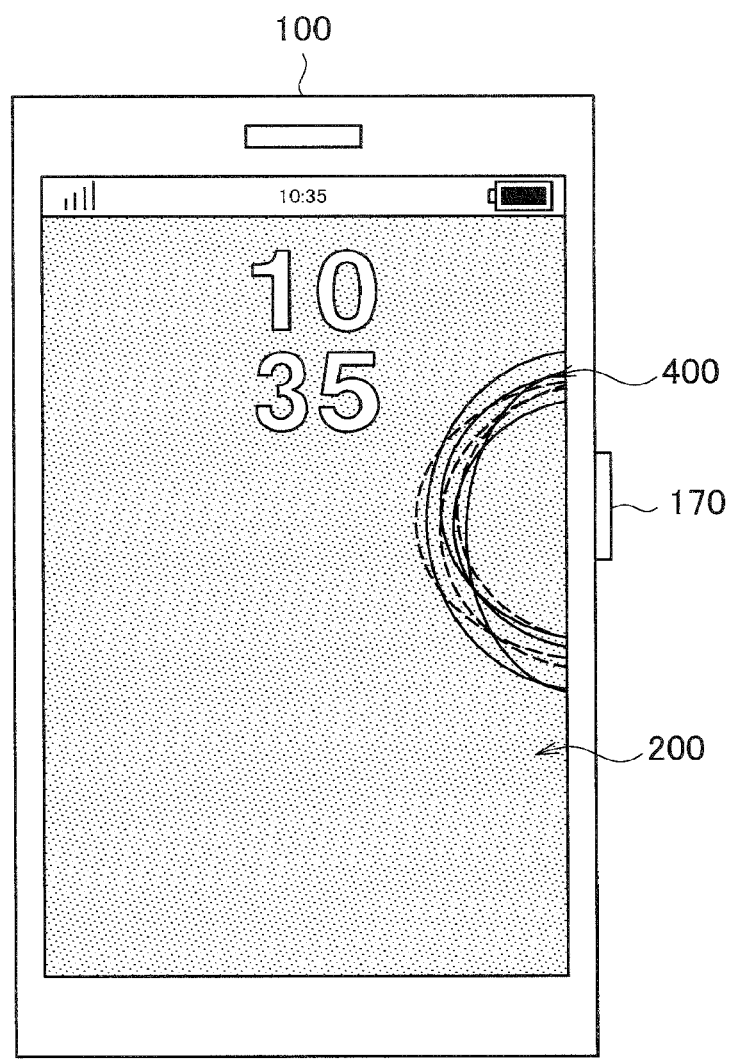
FIG. 16 is a diagram illustrating an example of a display screen in a terminal device according to an embodiment of the present disclosure.

The second modified embodiment of the authentication process screen has been described above. Next, a third modified embodiment of the authentication process screen will described. FIG. 16 to FIG. 19 are each a diagram illustrating the third modified embodiment of the authentication process screen. According to the third modified embodiment, as illustrated in FIG. 16, multiple ripple-like lines 400 are drawn to show that the fingerprint authentication process has started in the case when the authentication process has started. In the third modified embodiment, an example in which the lock screen 200 has a colored background image will be described.

Figure 17:
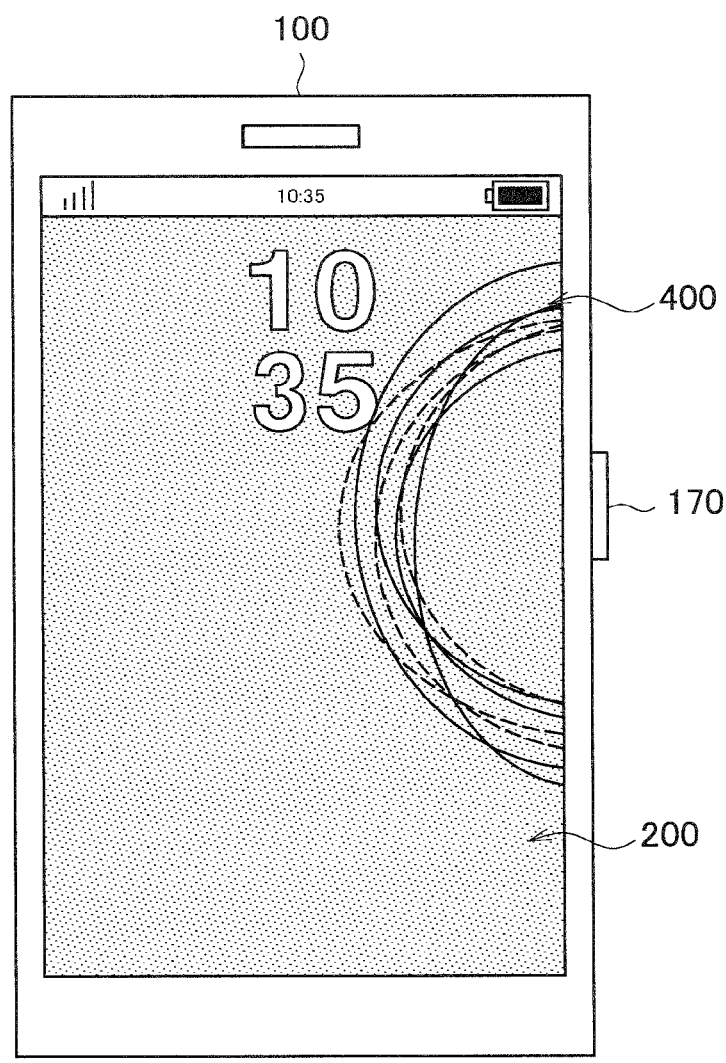
FIG. 17 is a diagram illustrating an example of a display screen in a terminal device according to an embodiment of the present disclosure.
Figure 18:
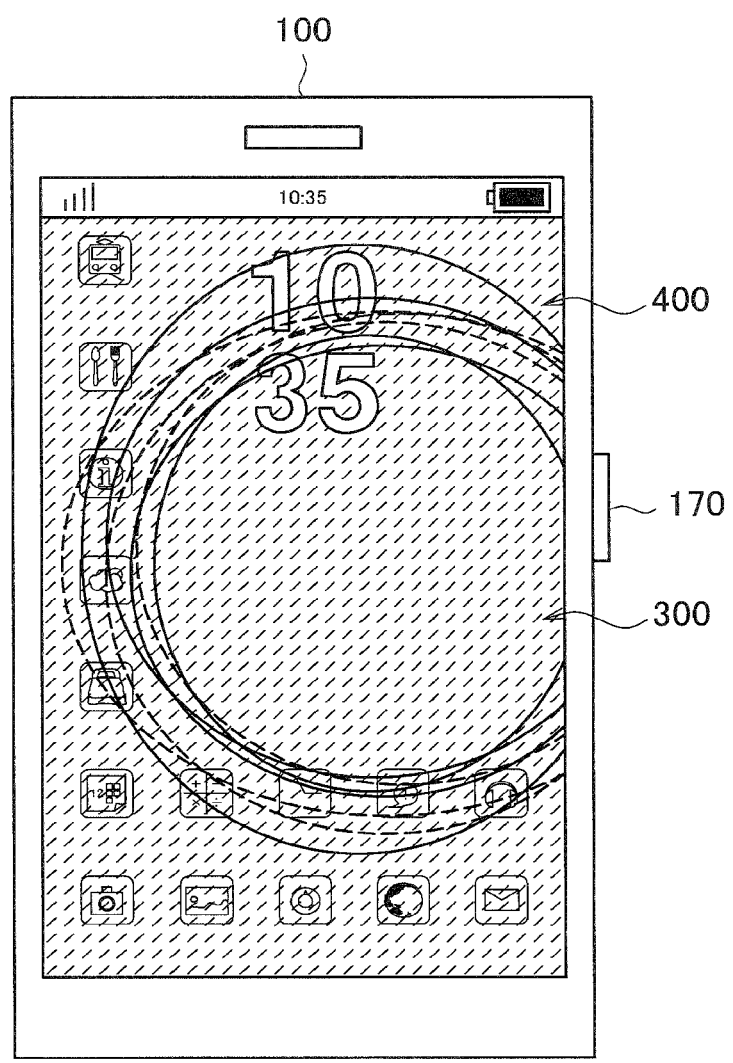
FIG. 18 is a diagram illustrating an example of a display screen in a terminal device according to an embodiment of the present disclosure.

As illustrated in FIG. 16 to FIG. 18, the ripple-like lines 400 are displayed as if they spread out. In the case when the authentication has succeeded, the terminal device 100 is unlocked and the home screen 300 is displayed as illustrated in FIG. 18. In this case, the ripple-like lines 400 are still displayed in the home screen 300. In other words, the ripple-like lines 400 are a part of the background image included in the home screen 300.

As an example of the transition from the screen in FIG. 17 to the screen in FIG. 18, the home screen 300 may be displayed by sliding the lock screen 200. Alternatively, transparency of the lock screen 200 may be gradually increased and thereby the home screen 300 may be finally displayed.

Figure 19:
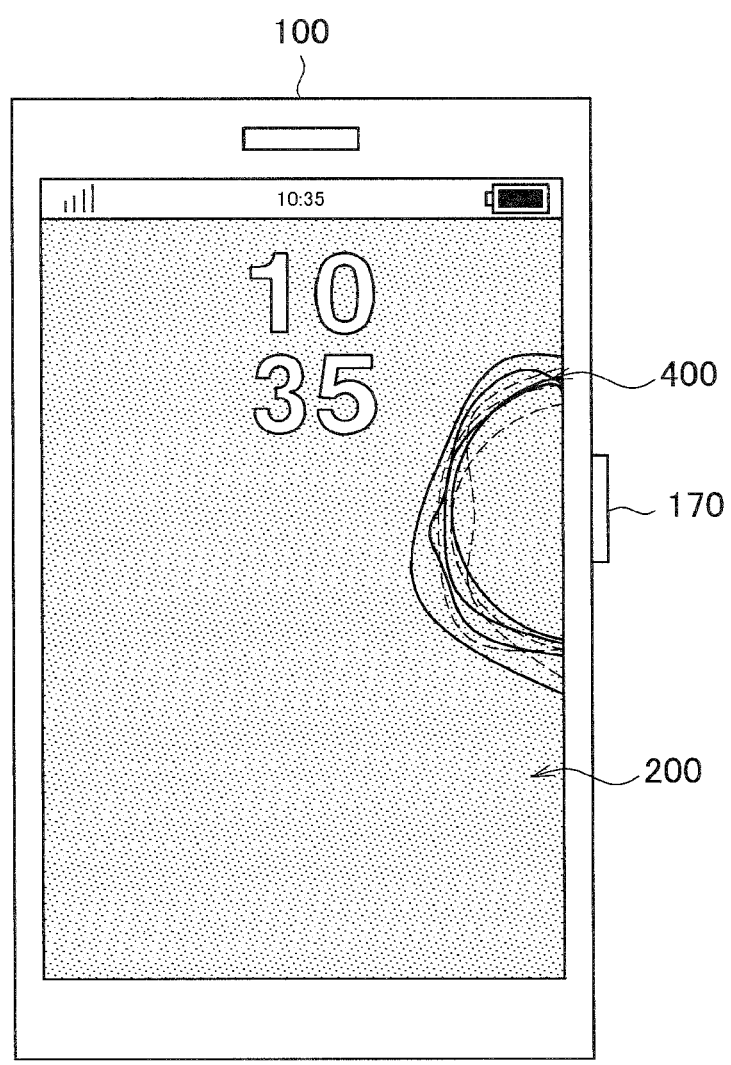
FIG. 19 is a diagram illustrating an example of a display screen in a terminal device according to an embodiment of the present disclosure.

FIG. 19 is a diagram illustrating a display screen in the case when the authentication process has failed according to the third modified embodiment. In the case when the authentication process has failed, the display control is performed such that the shapes of the ripple-like lines 400 deform as illustrated in FIG. 19. Due to such display control, a user can visually recognize that the authentication process has started, the authentication process has succeeded, and the authentication process has failed.

The example in which the ripple-like lines 400 are displayed in the authentication process screen and the home screen 300 has been described above. However the displayed image is not limited to the lines. For example, the displayed image may be a figure such as a circle, a quadrilateral, or a triangle. In this case, fail in an authentication process may be shown by deforming the figure when the authentication process has failed.

6. Fourth Modified Embodiment

Figure 20:
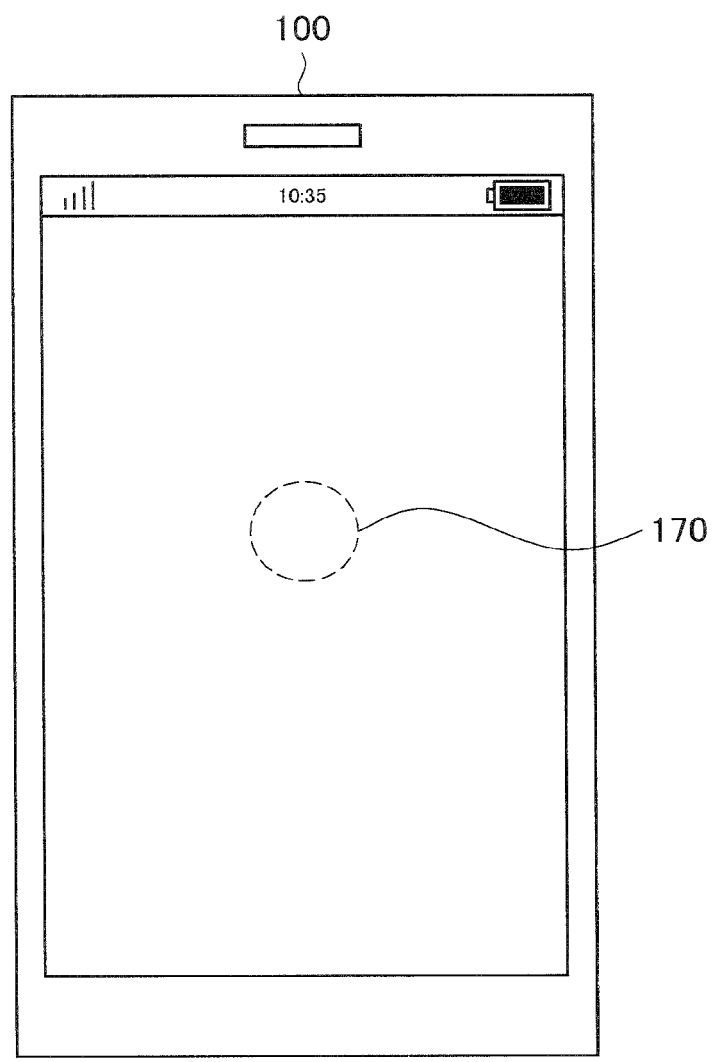
FIG. 20 is a diagram illustrating another example of a configuration of a terminal device according to an embodiment of the present disclosure.

The example in which the fingerprint reader 170 is disposed on the side surface of the terminal device 100 has been described above. Next, an example in which the fingerprint reader 170 is disposed on a back surface of the terminal device 100 will be described. FIG. 20 is a diagram illustrating an example of a position where the fingerprint reader 170 is disposed in the case when the fingerprint reader 170 is disposed on a back surface of the terminal device 100.

Figure 21:
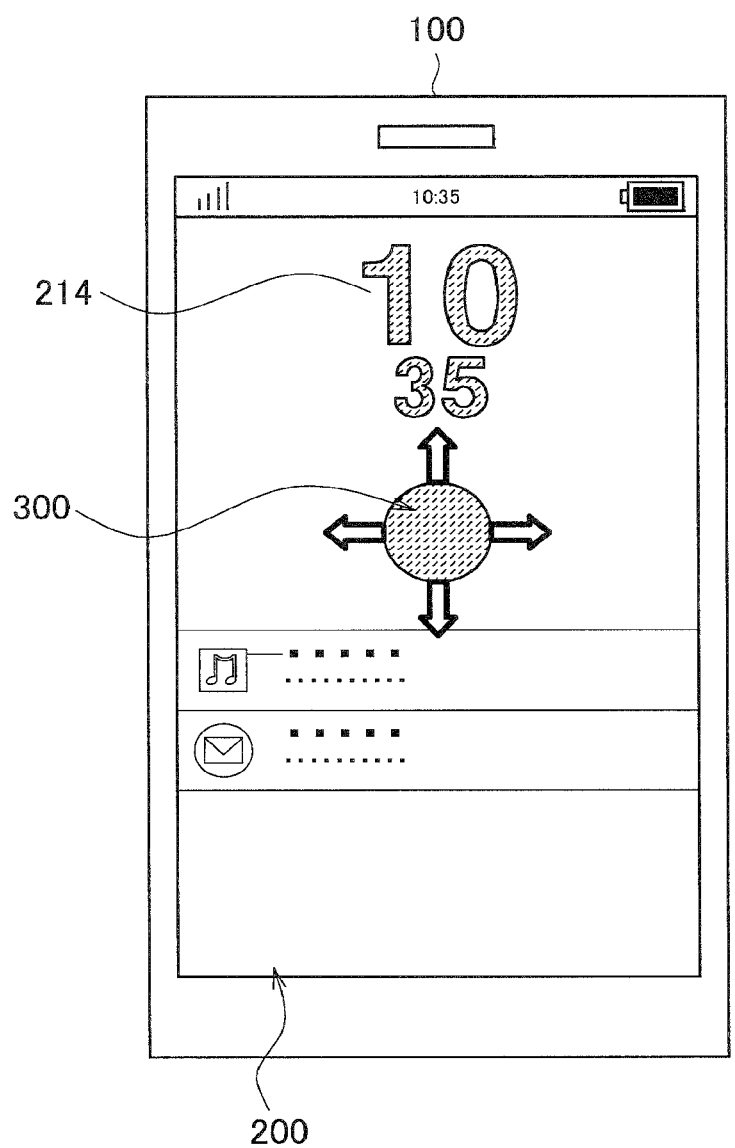
FIG. 21 is a diagram illustrating an example of a display screen in a terminal device according to an embodiment of the present disclosure.

In the case when the fingerprint reader 170 is disposed on the back surface of the terminal device 100 as illustrated in FIG. 20, the authentication process screen may be displayed in a away different from the above described examples. FIG. 21 is a diagram illustrating an example of the authentication process screen displayed in the case when the fingerprint reader 170 is disposed on the back surface of the terminal device 100.

As illustrated in FIG. 21, a circle centered at a point close to the fingerprint reader 170 is drawn in a display screen in the case when the fingerprint authentication process has started. Subsequently, the controller 160 performs display control such that the image constituting the home screen 300 is displayed in the circle and the size of the circle gradually increases. Due to such display control, a user can intuitively recognize that the user has pressed the terminal device 100 (or fingerprint reader 170) with his/her finger and thereby the authentication process has started.

As illustrated in FIG. 21, a part of the clock display 214 included in the lock screen 200 (number symbols "10" of the clock display 214 in FIG. 21) may be displayed larger than those in the initial lock screen 200 (state illustrated in FIG. 7) so as to emphasize the above described effect. Due to such display control, a user can feel as if the user has pressed the terminal device 100 (or fingerprint reader 170) with his/her finger and thereby the part of the clock display 214 has been popped up.

In the case when the authentication process has succeeded according to the fourth modified embodiment, the controller 160 performs display control such that the circle keeps enlarging and finally the whole of the home screen 300 is displayed. On the other hand, in the case when the authentication process has failed, the controller 160 performs display control such that the circle shrinks and the initial lock screen 200 (state illustrated in FIG. 7) is displayed.

In the above described example, the display image of the number symbols included in the clock display 214 is enlarged in the authentication process screen. However the display image to be enlarged in the authentication process screen is not limited to the number symbols. For example, the display image to be enlarged may be a widget or an icon. In addition, the number of display images to be enlarged is not limited to one. For example, an icon and a widget may be enlarged and displayed in the authentication process screen. To emphasize the above described effect, it is preferable that the image to be enlarged is displayed at a position close to the fingerprint reader 170.

Figure 22:
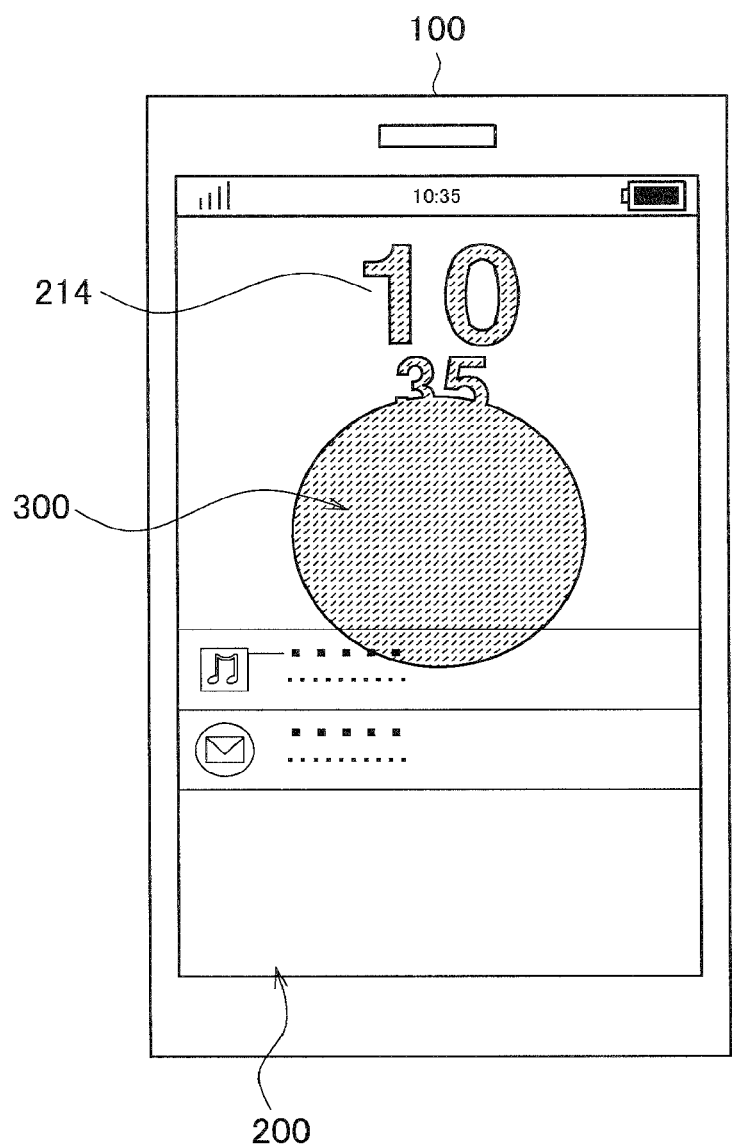
FIG. 22 is a diagram illustrating an example of a display screen in a terminal device according to an embodiment of the present disclosure.

Alternatively, the authentication process screen according to the fourth modified embodiment may be displayed in a different way. FIG. 22 is a diagram illustrating another authentication process screen displayed according to the fourth modified embodiment. In the example illustrated in FIG. 22, the image constituting the home screen 300 is displayed in the authentication process screen such that the image constituting the home screen 300 is integrated with a part of the image constituting the lock screen 200 (number symbols "10" of clock display 214 in FIG. 21). In the example illustrated in FIG. 22, a circle is drawn and the circle is integrated with the number symbols "10" in the clock display 214 in a way similar to the example illustrated in FIG. 21. In the circle, the image constituting the home screen 300 is displayed.

In the case when the authentication process has succeeded in the example illustrated in FIG. 22, the controller 160 performs display control such that the circle keeps enlarging and finally the whole of the home screen 300 is displayed. On the other hand, in the case when the authentication process has failed, the controller 160 performs display control such that the circle shrinks and the initial lock screen 200 (state illustrated in FIG. 7) is displayed.

According to the fourth modified embodiment, the image constituting the home screen 300 may be displayed by deforming a part of the number symbols in the clock display 214. In other words, as illustrated in FIG. 22, the image constituting the home screen 300 may be displayed by enlarging a part of the number symbols "10" in the clock display 214 (lower right part of number symbols "10" in FIG. 22).

7. Fifth Modified Embodiment

Figure 23:
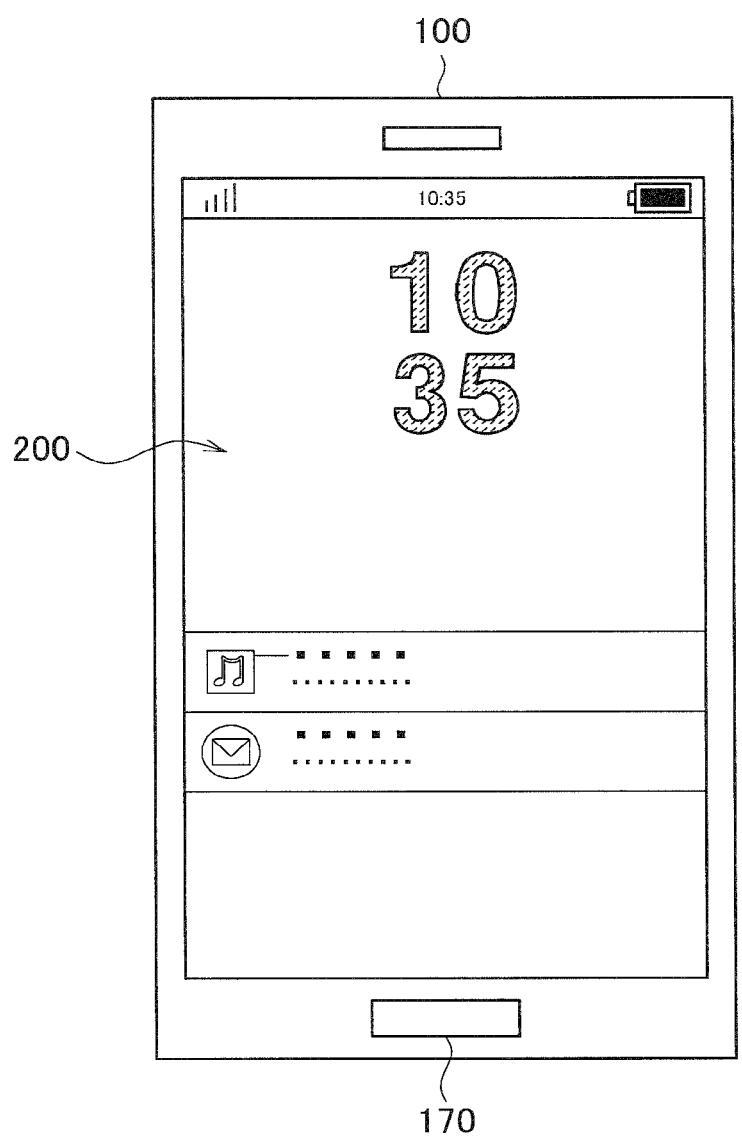
FIG. 23 is a diagram illustrating another example of a configuration of a terminal device according to an embodiment of the present disclosure.

The example in which the fingerprint reader 170 is disposed on the back surface of the terminal device 100 has been described above. Next, an example in which the fingerprint reader 170 is disposed on a lower side of the terminal device 100 will be described. FIG. 23 is a diagram illustrating an example of a position where the fingerprint reader 170 is disposed in the case when the fingerprint reader 170 is disposed on the bottom of the terminal device 100.

Figure 24:
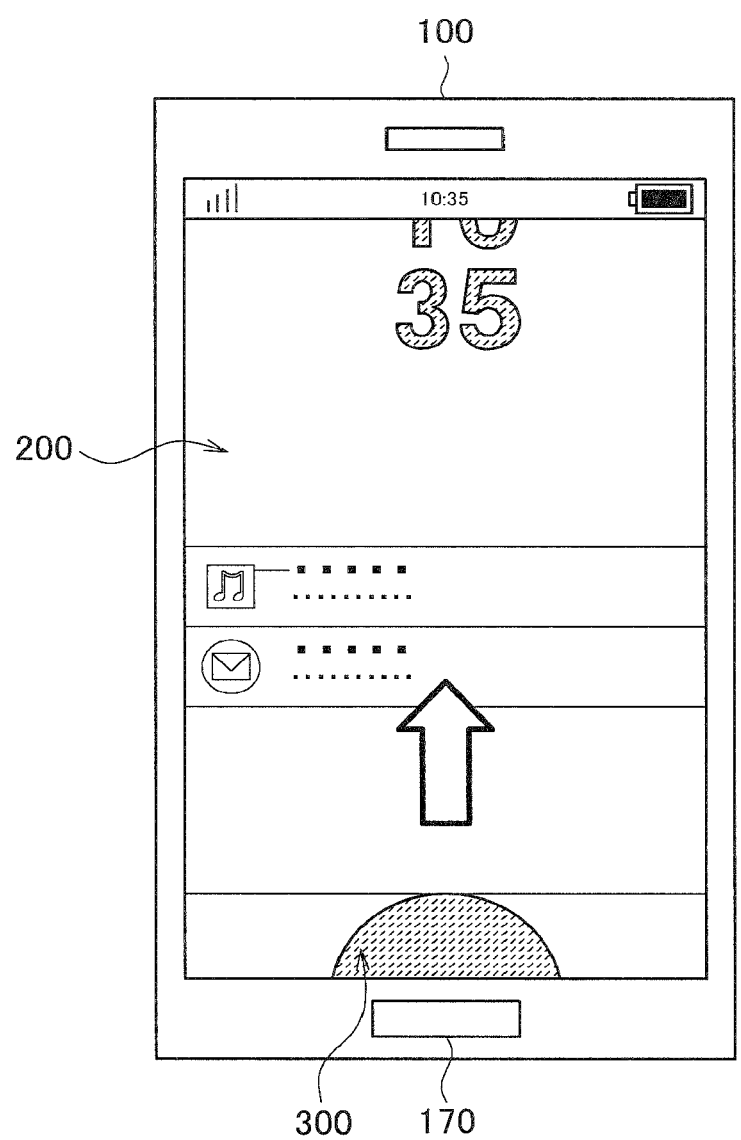
FIG. 24 is a diagram illustrating an example of a display screen in a terminal device according to an embodiment of the present disclosure.

In the case when the fingerprint reader 170 is disposed on the lower side of the terminal device 100 as illustrated in FIG. 23, the authentication process screen may be displayed in a away different from the above described examples. FIG. 24 is a diagram illustrating an example of the authentication process screen displayed in the case when the fingerprint reader 170 is disposed on the lower side of the terminal device 100.

As illustrated in FIG. 24, a semicircle centered at a point closest to the fingerprint reader 170 is drawn in a display screen in the case when the fingerprint authentication process has started. Subsequently, the controller 160 performs display control such that the image constituting the home screen 300 is displayed in the semicircle and the size of the semicircle gradually increases.

The controller 160 may perform display control such that the lock screen 200 slides to the top with enlargement in the semicircle. Due to such display control, a user can feel as if the lock screen 200 is pushed up by impact of a finger of the user pressing the terminal device 100 (or fingerprint reader 170).

8. Supplement

It should be understood by those skilled in the art that various modified embodiments, combinations, sub-combinations and alterations may occur depending on design requirements and other factors insofar as they are within the scope of the appended claims or the equivalents thereof.

For example, the fingerprint authentication is used as a way to authenticate a user according to the above described embodiments. However, another authentication method may be used for authenticating a user. For example, as the method for performing the authentication process, authentication method using other information such as vein authentication, face authentication, and voice authentication may be used.

In addition, in the above described embodiments, the terminal device 100 may be a smartphone, tablet terminal, electronic book reader, game terminal, or the like.

In addition, it is possible to provide a computer program for causing the controller 160 to operate as described above. Moreover, it is possible to provide a recording medium having the computer program stored therein.

9. Conclusion

As described above, the terminal device 100 according to the embodiments of the present disclosure displays, during the authentication process, the authentication process screen to show that the authentication process is going on. Therefore, the user can visually recognize that the authentication process is going on.

In addition, the lock screen 200 moves in accordance with a direction in which a finger of a user moves in the terminal device 100 according to the embodiments of the present disclosure. Alternatively, the image constituting the lock screen 200 or the home screen 300 moves in accordance with the direction in which the finger of the user moves. Due to such display control, a user can feel as if the display screen or the image constituting the display screen is moved by a user operation.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) A terminal device including:
a detector configured to detect start of an authentication process for authenticating a user; and
a display controller configured to display, during the authentication process, an authentication process screen by using a first image included in a first display screen that is displayed after the authentication process succeeds.

(2) The terminal device according to (1),
wherein, during the authentication process, the display controller displays a second display screen that is displayed before the authentication starts in addition to the first image.

(3) The terminal device according to (2),
wherein, during the authentication process, the display controller displays the first image and the second display screen in different regions.

(4) The terminal device according to (3),
wherein, during the authentication process, the display controller slides the second display screen and displays the first image.

(5) The terminal device according to (4), wherein
the authentication is fingerprint authentication,
the terminal device includes a fingerprint reader configured to read a fingerprint of the user on a side surface, and
the display controller slides the second display screen in a direction perpendicular to the side surface.

(6) The terminal device according to (4) or (5),
wherein the display controller brings the slid second display surface back into an original state in a case when the authentication process has failed.
(7) The terminal device according to (2),
wherein the display controller displays the authentication process screen during the authentication process in a manner that the first image is displayed behind the second display screen that is translucent.
(8) The terminal device according to any one of (1) to (7),
wherein the first image is formed of a line or a figure.
(9) The terminal device according to (8),
wherein the display controller deforms the line or the figure in a case when the authentication process has failed.
(10) The terminal device according to any one of (2) to (9),
wherein, during the authentication process, the display controller changes a display form of a second image that is displayed on the second display screen.
(11) The terminal device according to (10),
wherein the display controller enlarges a part of the second image during the authentication process.
(12) The terminal device according to any one of (2) to (11),
wherein the first display screen is a home screen, and the second display screen is a lock screen.
(13) A method including:
detecting start of an authentication process for authenticating a user; and
causing a processor to display, during the authentication process, an authentication process screen by using a first image included in a first display screen that is displayed after the authentication process succeeds.
(14) A program causing a processor to:
detect start of an authentication process for authenticating a user; and
displaying, during the authentication process, an authentication process screen by using a first image included in a first display screen that is displayed after the authentication process succeeds.

What is claimed is:

1. A terminal device comprising:
a detector configured to detect a touch operation, the touch operation corresponding to a start of an authentication process for authenticating a user; and
a display controller configured to
display, during the authentication process, an authentication process screen by using a first image included in a first display screen that is displayed after the authentication process succeeds, the authentication process screen having a degree of blurring,
display a second display screen that is displayed before the authentication starts in addition to the first image, the second display screen having a color,
during the authentication process, move the second display screen in a same direction as a direction of the touch operation, reduce the degree of blurring of the authentication process screen, and lighten the color of the second display screen,
in response to the authentication process failing,
deform at least a portion of a shape displayed in the authentication process screen and the second display screen during the authentication process, the shape representing an occurrence of the authentication process, and
move the second display screen in an opposite direction of the direction of the touch operation, and
in response to the authentication process succeeding, further reduce the degree of blurring of the authentication process screen and further lighten the color of the second display screen.

2. The terminal device according to claim 1,
wherein, during the authentication process, the display controller displays the first image and the second display screen in different regions.

3. The terminal device according to claim 2,
wherein, during the authentication process, the display controller slides the second display screen and displays the first image.

4. The terminal device according to claim 3, wherein
the authentication is fingerprint authentication,
the terminal device comprises a fingerprint reader configured to read a fingerprint of the user on a side surface, and
the display controller slides the second display screen in a direction perpendicular to the side surface.

5. The terminal device according to claim 3,
wherein the display controller brings the slid second display surface back into an original state in a case when the authentication process has failed.

6. The terminal device according to claim 1,
wherein the display controller displays the authentication process screen during the authentication process in a manner that the first image is displayed behind the second display screen that is translucent.

7. The terminal device according to claim 1,
wherein the first image is formed of a line or a figure.

8. The terminal device according to claim 7,
wherein the display controller deforms the line or the figure in a case when the authentication process has failed.

9. The terminal device according to claim 1,
wherein, during the authentication process, the display controller changes a display form of a second image that is displayed on the second display screen.

10. The terminal device according to claim 9,
wherein the display controller enlarges a part of the second image during the authentication process.

11. The terminal device according to claim 1,
wherein the first display screen is a home screen, and the second display screen is a lock screen.

12. A method comprising:
detecting start of an authentication process for authenticating a user;
displaying, during the authentication process, an authentication process screen by using a first image included in a first display screen that is displayed after the authentication process succeeds, the authentication process screen having a degree of blurring;
displaying a second display screen that is displayed before the authentication starts in addition to the first image, the second display screen having a color;
during the authentication process, moving the second display screen in a same direction as a direction of the touch operation, reducing the degree of blurring of the authentication process screen, and lightening the color of the second display screen;
in response to the authentication process failing,
deforming at least a portion of a shape displayed in the authentication process screen and the second display screen during the authentication process, the shape representing an occurrence of the authentication process, and
moving the second display screen in an opposite direction of the direction of the touch operation; and in response to the authentication process succeeding, further reducing the degree of blurring of the authentication process screen and further lighten the color of the second display screen.

13. A non-transitory computer-readable storage medium storing computer-readable instructions thereon which, when executed by a computer, cause the computer to perform a method, the method comprising detecting start of an authentication process for authenticating a user;

displaying, during the authentication process, an authentication process screen by using a first image included in a first display screen that is displayed after the authentication process succeeds, the authentication process screen having a degree of blurring;

displaying a second display screen that is displayed before the authentication starts in addition to the first image, the second display screen having a color;

during the authentication process, moving the second display screen in a same direction as a direction of the touch operation, reducing the degree of blurring of the authentication process screen, and lightening the color of the second display screen;

in response to the authentication process failing,
    deforming at least a portion of a shape displayed in the authentication process screen and the second display screen during the authentication process, the shape representing an occurrence of the authentication process, and
    moving the second display screen in an opposite direction of the direction of the touch operation; and in response to the authentication process succeeding, further reducing the degree of blurring of the authentication process screen and further lighten the color of the second display screen.

* * * * *